(12) United States Patent
Fushimi et al.

(10) Patent No.: US 10,268,529 B2
(45) Date of Patent: Apr. 23, 2019

(54) PARALLEL PROCESSING APPARATUS AND INTER-NODE COMMUNICATION METHOD

(71) Applicant: FUJITSU LIMITED, Kawasaki-shi, Kanagawa (JP)

(72) Inventors: Masaaki Fushimi, Numazu (JP); Tsuyoshi Hashimoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 33 days.

(21) Appl. No.: 15/788,878

(22) Filed: Oct. 20, 2017

(65) Prior Publication Data

US 2018/0181450 A1 Jun. 28, 2018

(30) Foreign Application Priority Data

Dec. 28, 2016 (JP) .................................. 2016-255821

(51) Int. Cl.
*G06F 9/54* (2006.01)
*H04L 12/861* (2013.01)
*G06F 13/16* (2006.01)
*G06F 13/42* (2006.01)
*G06F 9/48* (2006.01)
*G06F 15/173* (2006.01)

(52) U.S. Cl.
CPC ............ *G06F 9/544* (2013.01); *G06F 9/4843* (2013.01); *G06F 13/1673* (2013.01); *G06F 13/4234* (2013.01); *G06F 15/17318* (2013.01); *H04L 49/90* (2013.01)

(58) Field of Classification Search
None
See application file for complete search history.

(56) References Cited

U.S. PATENT DOCUMENTS

| | | | | |
|---|---|---|---|---|
| 6,665,700 | B1* | 12/2003 | Sugisaki | G06F 15/16 718/104 |
| 2003/0018684 | A1* | 1/2003 | Ohsawa | G06F 9/3842 718/102 |
| 2009/0307464 | A1* | 12/2009 | Steinberg | G06F 9/505 712/31 |
| 2013/0332932 | A1* | 12/2013 | Teruya | G06F 9/54 718/102 |
| 2014/0379725 | A1* | 12/2014 | Choe | G06F 17/30321 707/741 |
| 2015/0293974 | A1* | 10/2015 | Loo | G06F 17/30516 707/752 |
| 2018/0150374 | A1* | 5/2018 | Ratcliff | G06F 11/3433 |
| 2018/0150416 | A1* | 5/2018 | Kubala | G06F 13/1673 |

FOREIGN PATENT DOCUMENTS

JP 11-110362 4/1999

* cited by examiner

*Primary Examiner* — Otis L Thompson, Jr.
(74) *Attorney, Agent, or Firm* — Fujitsu Patent Center

(57) ABSTRACT

A first node determines a second node belonging to the same first group as the first node, and creates a first receive buffer corresponding to the second node in a memory. The first node determines a third and a fourth node belonging to a second group, and creates a second receive buffer corresponding to the third node in the memory, without creating a receive buffer corresponding to the fourth node. The first node uses the first receive buffer to receive messages when communicating with the second node, uses the second receive buffer to receive messages when communicating with the third node, and uses the first receive buffer or the second receive buffer to receive messages when communicating with the fourth node.

7 Claims, 23 Drawing Sheets

| | | | | | |
|---|---|---|---|---|---|
| GROUP #0 41 | | | GROUP #1 42 | | |
| rank#0 (0, 0) | rank#1 (0, 1) | rank#2 (0, 2) | rank#9 (1, 0) | rank#10 (1, 1) | rank#11 (1, 2) |
| rank#3 (0, 3) | rank#4 (0, 4) | rank#5 (0, 5) | rank#12 (1, 3) | rank#13 (1, 4) | rank#14 (1, 5) |
| rank#6 (0, 6) | rank#7 (0, 7) | rank#8 (0, 8) | rank#15 (1, 6) | rank#16 (1, 7) | rank#17 (1, 8) |
| rank#27 (3, 0) | rank#28 (3, 1) | rank#29 (3, 2) | rank#18 (2, 0) | rank#19 (2, 1) | rank#20 (2, 2) |
| rank#30 (3, 3) | rank#31 (3, 4) | rank#32 (3, 5) | rank#21 (2, 3) | rank#22 (2, 4) | rank#23 (2, 5) |
| rank#33 (3, 6) | rank#34 (3, 7) | rank#35 (3, 8) | rank#24 (2, 6) | rank#25 (2, 7) | rank#26 (2, 8) |
| GROUP #3 44 | | | GROUP #2 43 | | |

FIG. 7

PARALLEL PROCESSING APPARATUS AND INTER-NODE COMMUNICATION METHOD

CROSS-REFERENCE TO RELATED APPLICATION

This application is based upon and claims the benefit of priority of the prior Japanese Patent Application No. 2016-255821, filed on Dec. 28, 2016, the entire contents of which are incorporated herein by reference.

FIELD

The embodiments discussed herein relate to a parallel processing apparatus and an inter-node communication method.

BACKGROUND

Parallel processing apparatuses are used, which divide a task with a large amount of computation into a plurality of subtasks with a small amount of computation and execute the subtasks by using in parallel a plurality of computers (may be called "computing nodes," or simply "nodes") connected to a network. In such a parallel processing apparatus, nodes may communicate with each other during execution of subtasks. Therefore, in creating an application program for the parallel processing apparatus, a communication library, such as a Message Passing Interface (MPI) library, may be used. The communication library eliminates the need for a user to define the detailed procedure for the inter-node communication in the application program.

There has been proposed a distributed-memory parallel computing system in which each node sends data to all nodes except itself. In this proposed parallel computing system, a plurality of nodes are able to perform mutual communication in $2^n$ phases. Each node performs exclusive OR operation on an identification number given to the own node and a phase number, and selects another node whose identification number matches the resulting value of the exclusive OR operation, as a communication partner.

Please see, for example, Japanese Laid-open Patent Publication No. 11-110362.

If there is a possibility that a certain node communicates with a plurality of other nodes, the certain node may prepare individual receive buffers corresponding one-to-one to the other nodes in a memory thereof, in order to improve the efficiency of the inter-node communication. However, the preparation of the individual receive buffers for all the other nodes increases the memory usage, and this is a problem.

SUMMARY

According to one aspect, there is provided a non-transitory computer-readable recording medium storing a computer program that causes a computer used as a first node among a plurality of nodes to perform a procedure including: determining one or more second nodes belonging to a same first group as the first node among the plurality of nodes, and creating first receive buffers corresponding one-to-one to the one or more second nodes in a memory provided in the first node; determining a third node belonging to a second group and one or more fourth nodes belonging to the second group among the plurality of nodes, and creating a second receive buffer corresponding to the third node in the memory, without creating receive buffers corresponding to the one or more fourth nodes in the memory; and using one of the first receive buffers corresponding to one of the one or more second nodes to receive a message when communicating with the one of the one or more second nodes, using the second receive buffer to receive a message when communicating with the third node, and using one of the first receive buffers and the second receive buffer to receive a message when communicating with one of the one or more fourth nodes.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 illustrates an example of how to calculate a group identifier and an intra-group identifier;

DESCRIPTION OF EMBODIMENTS

Figure 1:
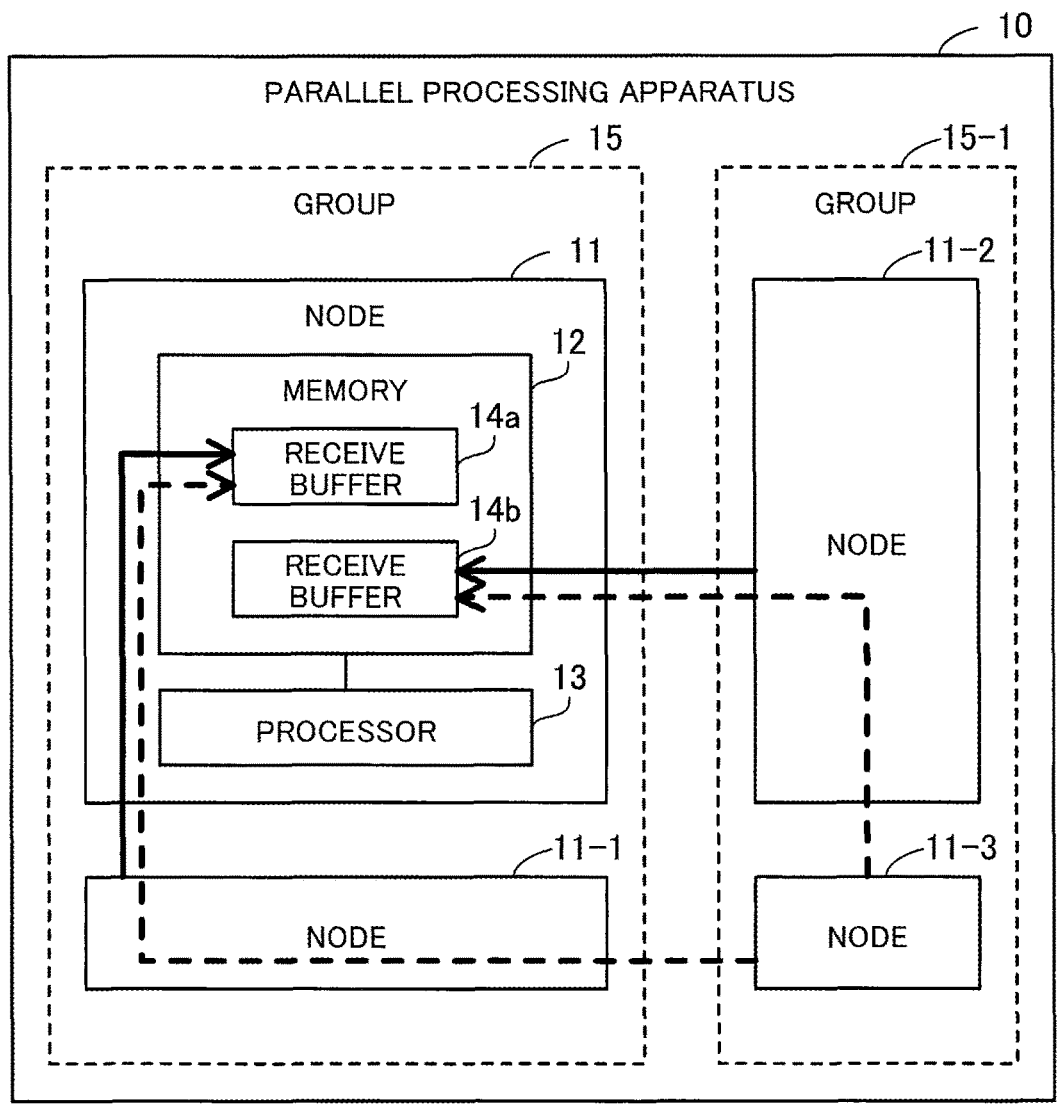
FIG. 1 illustrates an example of a parallel processing apparatus according to a first embodiment.

Several embodiments will be described below with reference to the accompanying drawings, wherein like reference numerals refer to like elements throughout.

First Embodiment

A first embodiment will be described.

FIG. 1 illustrates an example of a parallel processing apparatus according to the first embodiment.

The parallel processing apparatus 10 of the first embodiment includes a plurality of nodes including nodes 11, 11-1, 11-2, and 11-3. For example, the nodes 11, 11-1, 11-2, and 11-3 are physical machines, such as server computers. The nodes 11, 11-1, 11-2, and 11-3 are connected to a network. The parallel processing apparatus 10 is able to cause the nodes 11, 11-1, 11-2, and 11-3 to perform information processing in parallel. The nodes 11, 11-1, 11-2, and 11-3 may communicate messages with each other while performing the information processing. For example, the message transmission may be implemented by using a communication library, such as a Message Passing Interface (MPI).

The node 11 includes a memory 12 and a processor 13. Each of the nodes 11-1, 11-2, and 11-3 may include a memory and a processor, and may execute the same communication method as the node 11, which will be described later. The memory 12 is a so-called primary memory device, and for example, a volatile semiconductor memory, such as a Random Access Memory (RAM).

The processor 13 is a Central Processing Unit (CPU) or a Digital Signal Processor (DSP), for example. It is noted that, however, the processor 13 may include an Application Specific Integrated Circuit (ASIC), a Field Programmable Gate Array (FPG), or other application-specific electronic circuits. For example, the processor 13 executes programs stored in a memory device, such as the memory 12. The programs include an inter-node communication program for controlling communication with the nodes 11-1, 11-2, and 11-3. In this connection, a set of multiple processors may be called a "multiprocessor" or simply a "processor."

In the memory 12, one or more receive buffers may be created to receive messages from other nodes. The processor 13 creates one or more receive buffers in the memory 12 when starting to perform information processing (for example, when initializing a communication library). At this time, the processor 13 specifies a node working group that is used to perform parallel processing in which the node 11 is involved, and divides the node working group into a plurality of groups. For example, the node working group to be used in the parallel processing is specified based on mutual communication between the nodes 11, 11-1, 11-2, and 11-3. The processor 13 creates one or more receive buffers in the memory 12 on the basis of the grouping in the following way.

The processor 13 determines one or more other nodes (second nodes) belonging to the same group 15 (first group) as the node 11 (first node) from the node working group used in the parallel processing. For example, the second nodes are determined based on identifiers given to the respective nodes 11, 11-1, 11-2, and 11-3. Identification numbers, such as "ranks", may be used as the identifiers. For example, with respect to each node, the processor 13 calculates a set of a group identifier and an intra-group identifier of the node from the identifier of the node. The processor 13 determines, as the second nodes, nodes with the same group identifier as the node 11 and different intra-group identifiers from the node 11. Here, the node 11-1 is determined as a second node.

The processor 13 creates individual receive buffers (first receive buffers) corresponding one-to-one to the determined second nodes in the memory 12. Here, a receive buffer 14a corresponding to the node 11-1 is created in the memory 12.

In addition, the processor 13 determines one other node (third node) and one or more other nodes (fourth nodes) belonging to a group 15-1 (second group) different from the group 15, from the node working group used in the parallel processing. For example, the third node is a node (partner node) corresponding to the node 11 among the nodes belonging to the group 15-1, and the fourth nodes are partner nodes of the second nodes among the nodes belonging to the group 15-1. For example, the third node and fourth nodes are determined based on the identifiers given to the respective nodes. For example, the processor 13 determines a node with a different group identifier from the node 11 and the same intra-group identifier as the node 11, as the third node. In addition, the processor 13 determines nodes with different group identifiers and different intra-group identifiers from the node 11, as the fourth nodes. Here, the node 11-2 is determined as the third node, and the node 11-3 is determined as a fourth node.

The processor 13 creates a receive buffer (second receive buffer) corresponding to the determined third node in the memory 12. Here, a receive buffer 14b corresponding to the node 11-2 is created in the memory 12. On the other hand, the processor 13 does not create any receive buffers corresponding to the determined fourth nodes in the memory 12, meaning that creation of the receive buffers is omitted.

When communicating with the node 11-1, the processor 13 exercises control so as to use the receive buffer 14a corresponding to the node 11-1 to receive messages. For example, when the node 11-1 sends a message to the node 11, the processor 13 writes the message in the receive buffer 14a, so as to enable the node 11-1 to communicate directly with the node 11. In addition, when communicating with the node 11-2, the processor 13 exercises control so as to use the receive buffer 14b to receive messages. For example, when the node 11-2 sends a message to the node 11, the processor 13 writes the message in the receive buffer 14b, so as to enable the node 11-2 to communicate directly with the node 11.

Meanwhile, an individual receive buffer corresponding to the node 11-3 is not created in the memory 12. Therefore, when communicating with the node 11-3, the processor 13 exercises control so as to use the receive buffer 14a or the receive buffer 14b to receive messages.

It may be so designed that, when sending a message from the node 11-3 to the node 11, the message is sent via the node 11-1, which is a partner node of the sender node. In this case, for example, the node 11-3 writes the message in a receive buffer created for the node 11-3 in the node 11-1. Since the node 11-1 is a partner node of the node 11-3, the receive buffer for node 11-3 is prepared in the node 11-1. The node 11-1 then transfers the received message to the receive buffer 14a.

Alternatively, it may be so designed that, when sending a message from the node 11-3 to the node 11, the message is sent via the node 11-2, which is a partner node of the destination node. In this case, for example, the node 11-3 writes the message in a receive buffer created for the node 11-3 in the node 11-2. Since the node 11-2 belongs to the same group as the node 11-3, the receive buffer for node 11-3 is prepared in the node 11-2. The node 11-2 then transfers the received message to the receive buffer 14b.

With the parallel processing apparatus 10 of the first embodiment, the receive buffer 14a is created in the memory 12 for the node 11-1 belonging to the same group 15 as the node 11. In addition, the receive buffer 14b is created in the memory 12 for the node 11-2 that corresponds to the node 11 among the nodes belonging to the group 15-1. Meanwhile, no receive buffer is created for the node 11-3 that does not correspond to the node 11 among the nodes belonging to the group 15-1. When communicating with the node 11-3, the node 11 uses the receive buffer 14a or the receive buffer 14b to receive messages. For example, messages generated by the node 11-3 are sent to the node 11 via the node 11-1 or the node 11-2.

The above approach makes it possible to reduce the number of receive buffers and to reduce the memory usage accordingly, compared with the case where receive buffers corresponding one-to-one to all the other nodes are created in the memory 12 of the node 11.

Second Embodiment

A second embodiment will now be described.

Figure 2:
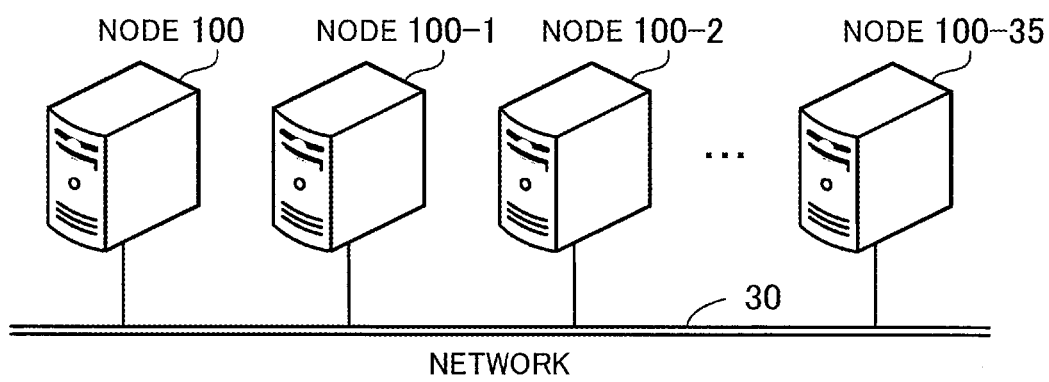
FIG. 2 illustrates an example of a parallel processing apparatus according to a second embodiment.

FIG. 2 illustrates an example of a parallel processing apparatus according to the second embodiment.

The parallel processing apparatus of the second embodiment includes at least 36 nodes (nodes 100, 100-1, 100-2, ..., 100-35). The nodes 100, 100-1, 100-2, ..., 100-35 are connected to a network 30.

The parallel processing apparatus of the second embodiment deploys the same kind of user program in the plurality of nodes, and causes the plurality of nodes to execute the user program in parallel, thereby achieving the parallel processing. During execution of the parallel processing, the plurality of nodes may communicate with each other. The frequency of communication and combinations of nodes that communicate with each other depend on the user program.

In creating a user program, an MPI library may be used for defining inter-node communication. The MPI library eliminates the need to describe the detailed procedure for the communication in the user program, thereby making it easy to create the user program. When executing a user program that refers to the MPI library, each node initializes the MPI library at the start of the parallel processing, to get into a state where the node is able to communicate with other nodes. The initialization of the MPI library involves loading of the MPI library to the RAM so as to enable the user program to call the MPI library, and preparation of receive buffers in the RAM for temporarily storing messages received from other nodes. The user program occasionally calls the MPI library, so as to achieve the inter-node communication for transmission and/or receipt of messages.

In parallel processing, a plurality of "processes" are performed in parallel. Each node performs one or more processes. In the second embodiment, it is assumed that one node performs one process, for simple explanation. Note that one node is able to perform a plurality of processes. For example, in a node having a plurality of processors, each processor may execute one process. In addition, in a node having a plurality of processor cores, each processor core may execute one process.

When the user program uses the MPI library, an identification number called a "rank" is given to each process. Ranks are non-negative consecutive integers starting with "0." The maximum rank value is smaller by one than the number of processes. For example, the ranks are determined on the basis of communication performed between a plurality of nodes in accordance with the MPI library.

Figure 3:
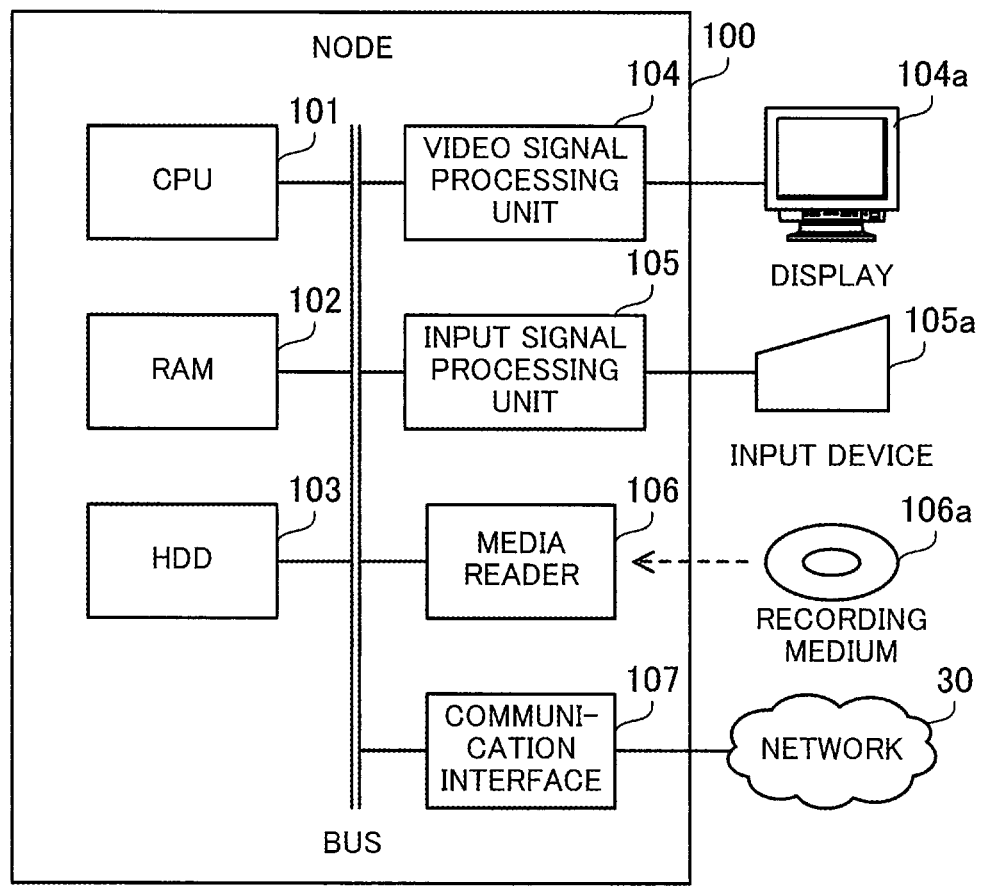
FIG. 3 is a block diagram illustrating an example of hardware of a node.

FIG. 3 is a block diagram illustrating an example of hardware of a node.

The node 100 includes a CPU 101, a RAM 102, a Hard Disk Drive (HDD) 103, a video signal processing unit 104, an input signal processing unit 105, a media reader 106, and a communication interface 107. These units are connected to a bus.

The CPU 101 is a processor that includes an operational circuit to execute instructions of a program. The CPU 101 loads at least part of a program and data from the HDD 103 to the RAM 102 and executes the program. In this connection, the CPU 101 may be provided with a plurality of processor cores or a plurality of processors. The node 100 may perform processing, which will be described later, in parallel using a plurality of processors or processor cores. In addition, a set of multiple processors may be called a "multiprocessor" or simply a "processor."

The RAM 102 is a volatile semiconductor memory that temporarily stores programs to be executed by the CPU 101 and data to be used by the CPU 101 in processing. In this connection, the node 100 may be provided with a kind of memory different from RAM or a plurality of memories.

The HDD 103 is a non-volatile storage device that stores software programs, such as Operating System (OS), middleware, and application software, and data. The programs include an inter-node communication program. In this connection, the node 100 may be provided with another kind of storage device, such as a flash memory or Solid State Drive (SSD), or a plurality of non-volatile storage devices.

The video signal processing unit 104 outputs images to a display 104a connected to the node 100 in accordance with instructions from the CPU 101. As the display 104a, a Cathode Ray Tube (CRT) display, Liquid Crystal Display (LCD), plasma display, Organic Electro-Luminescence (OEL) display, or another may be used.

The input signal processing unit 105 obtains an input signal from an input device 105a connected to the node 100, and gives the received input signal to the CPU 101. As the input device 105a, a pointing device, such as a mouse, a touch panel, a touchpad, or a trackball, a keyboard, a remote controller, a button switch, or another may be used. In addition, plural kinds of input devices may be connected to the node 100.

The media reader 106 is a reading device that reads programs and data from a recording medium 106a. For example, as the recording medium 106a, a magnetic disk, an optical disc, a magneto-optical disk (MO), a semiconductor memory, or another may be used. Magnetic disks include Flexible Disks (FD) and HDDs. Optical discs include Compact Discs (CD) and Digital Versatile Discs (DVD).

For example, the media reader 106 copies a program and data from the recording medium 106a into another recording medium, such as the RAM 102 or HDD 103. Then, the program is executed by the CPU 101, for example. In this connection, the recording medium 106a may be a portable recording medium and may be used for distributing programs and data. In addition, the recording medium 106a and HDD 103 may be called computer-readable recording media.

The communication interface 107 is connected to the network 30 to communicate with other nodes over the network 30. For example, the communication interface 107 is a wired communication interface that is connected to a communication device, such as a switch, with a cable. Alternatively, the communication interface 107 may be a wireless communication interface that is connected to a base station with a wireless link.

The following describes a basic method for inter-node communication using an MPI library. The parallel processing apparatus of the second embodiment is able to perform two kinds of communication: eager communication and rendezvous communication, which will be described later. The eager communication is preferable for transmission of a small data content (data payload), whereas the rendezvous communication is preferable for transmission of a large data payload.

Figure 4:
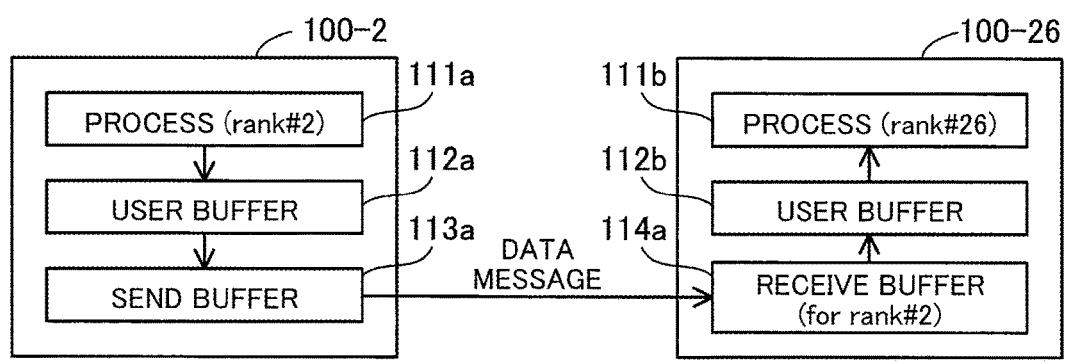
FIG. 4 illustrates an example of direct eager communication.

FIG. 4 illustrates an example of direct eager communication.

Here, it is assumed that a process 111a of rank #2 is assigned to the node 100-2, and a process 111b of rank #26 is assigned to the node 100-26. The following describes the case where the process 111a sends a data payload to the process 111b.

The process 111a dynamically creates a user buffer 112a in the RAM of the node 100-2. The process 111a writes the data payload to be sent, in the user buffer 112a, and calls the MPI library. A send buffer 113a is created in the RAM of the node 100-2 at the initialization of the MPI library. The called MPI library generates a data message by appending a header for MPI communication to the data payload stored in the user buffer 112a, and writes the data message in the send buffer 113a. The MPI library sends the data message stored in the send buffer 113a, to a receive buffer 114a of the node 100-26.

The process 111b dynamically creates a user buffer 112b in the RAM of the node 100-26. The process 111b calls the MPI library in order to wait for receipt of a data payload from the process 111a. The receive buffer 114a is created in the RAM of the node 100-26 at the initialization of the MPI library. The receive buffer 114a is used to receive messages from the process 111a, that is, is a receive buffer for rank #2. The node 100-2 obtains in advance the address of the receive buffer 114a through inter-node communication or the like that is performed at the initialization of the MPI library.

The MPI library of the node 100-26 monitors arrival of messages at the receive buffer 114a. When a data message arrives at the receive buffer 114a, the MPI library removes a header from the data message to extract a data payload, and writes the data payload in the user buffer 112b. The process 111b is able to refer to the data payload after the data payload is written in the user buffer 112b.

Figure 5:
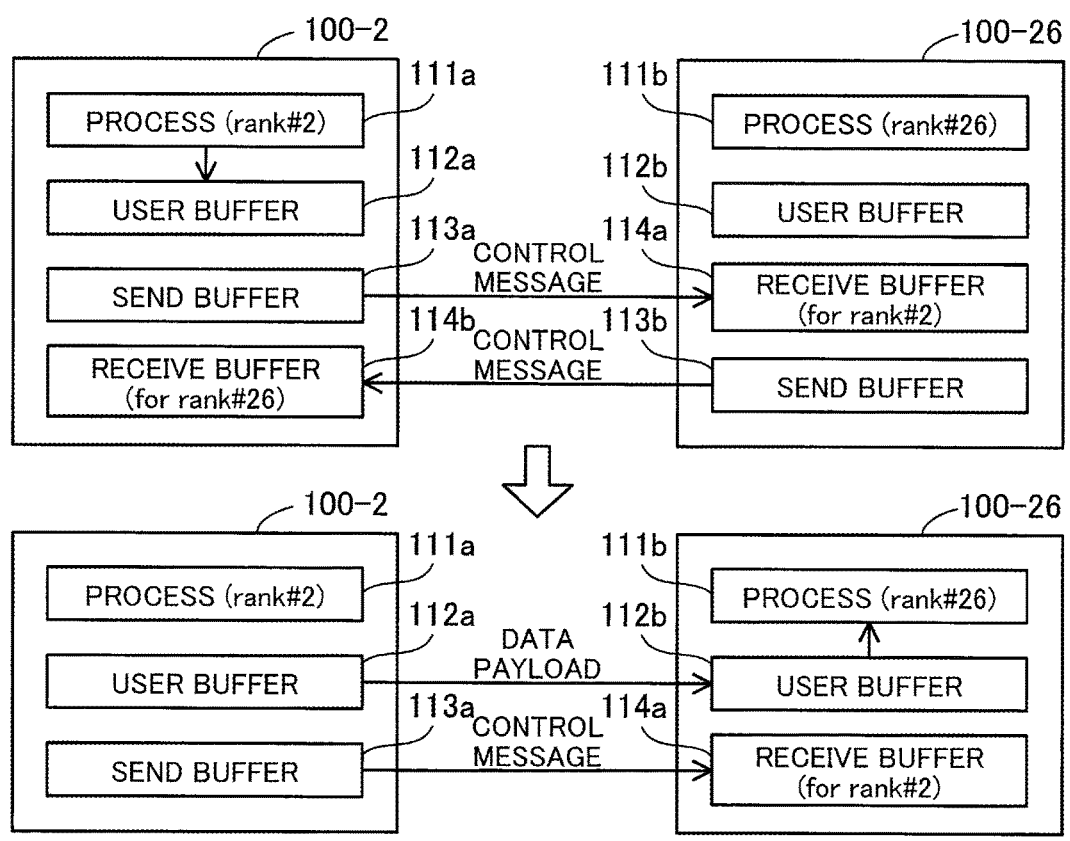
FIG. 5 illustrates an example of direct rendezvous communication.

FIG. 5 illustrates an example of direct rendezvous communication.

As in the eager communication illustrated in FIG. 4, the following describes the case where the process 111a of rank #2 assigned to the node 100-2 sends a data payload to the process 111b of rank #26 assigned to the node 100-26.

The process 111a dynamically creates a user buffer 112a in the RAM of the node 100-2. The process 111a writes the data payload to be sent, in the user buffer 112a, and calls the MPI library. A send buffer 113a is created in the RAM of the node 100-2 at the initialization of the MPI library. The called MPI library generates a control message (request control message) requesting the start of rendezvous communication, and writes the request control message in the send buffer 113a. The MPI library sends the request control message stored in the send buffer 113a to a receive buffer 114a of the node 100-26. For example, the MPI library sends the request control message with the address of the receive buffer 114a specified.

The process 111b dynamically creates a user buffer 112b in the RAM of the node 100-26. The process 111b calls the MPI library in order to wait for receipt of a data payload from the process 111a. The receive buffer 114a is created in the RAM of the node 100-26 at the initialization of the MPI library. The receive buffer 114a is a receive buffer for rank #2. The node 100-2 obtains the address of the receive buffer 114a in advance. When the request control message arrives at the receive buffer 114a, the MPI library of the node 100-26 generates a control message (response control message) indicating a response to the request control message, and writes the response control message in a send buffer 113b.

The response control message includes the address of the user buffer 112b. The MPI library sends the response control message stored in the send buffer 113b to a receive buffer 114b of the node 100-2. The receive buffer 114b is created in the RAM of the node 100-2 at the initialization of the MPI library. The receive buffer 114b is used to receive messages from the process 111b, that is, is a receive buffer for rank #26. The node 100-26 obtains in advance the address of the receive buffer 114b through inter-node communication or the like that is performed at the initialization of the MPI library.

When the response control message arrives at the receive buffer 114b, the MPI library of the node 100-2 sends the data payload stored in the user buffer 112a to the user buffer 112b specified in the response control message. At this time, the MPI library is able to send the data payload directly to the user buffer 112b, not via the send buffer 113a or the receive buffer 114a. In addition, the MPI library generates a control message (completion control message) indicating the completion of the rendezvous communication, and writes the completion control message in the send buffer 113a. The MPI library then sends the completion control message stored in the send buffer 113a to the receive buffer 114a.

When the completion control message arrives at the receive buffer 114a, the MPI library of the node 100-26 determines that the rendezvous communication is complete. For example, the MPI library notifies the process 111b of the arrival of the data payload. After the rendezvous communication is determined to be complete, the process 111b is able to refer to the data payload stored in the user buffer 112b.

In the manner as described above, the eager communication uses previously-created receive buffers to unidirectionally send a data payload from a sender node to a destination node. Therefore, in the case where the size of the data payload is sufficiently smaller than the sizes of the receive buffers, the eager communication achieves more efficient transmission of the data payload. On the other hand, the rendezvous communication uses a control message to specify a write-destination buffer from a destination node to a sender node each time a data payload is sent, so that the data payload is sent, not via previously-created receive buffers. Therefore, in the case where the size of the data payload is big, the rendezvous communication achieves more efficient transmission of the data payload.

If it is so designed as to enable direct message transmission from one node to another, as illustrated in FIGS. 4 and 5, there causes a problem that each node needs to create a large number of receive buffers in its RAM in advance. The following describes a problem in the buffer arrangement.

Figure 6:
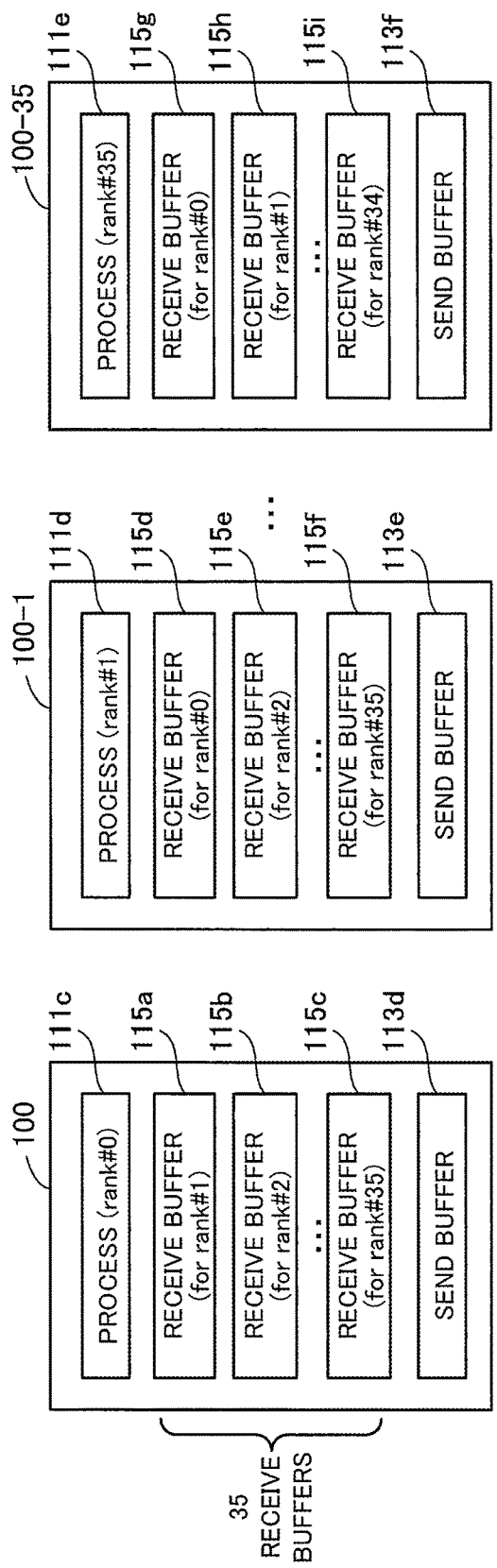
FIG. 6 illustrates a first example of buffer arrangement.

FIG. 6 illustrates a first example of buffer arrangement.

A process 111c of rank #0 is assigned to the node 100. In this buffer arrangement method, the node 100 creates a send buffer 113d at the initialization of the MPI library. In addition, the node 100 creates 35 receive buffers corresponding one-to-one to processes of ranks #1 to #35 assigned to the nodes except the node 100, at the initialization of the MPI library. A receive buffer 115a corresponds to the rank #1, a receive buffer 115b corresponds to the rank #2, and a receive buffer 115c corresponds to the rank #35.

A process 111d of rank #1 is assigned to the node 100-1. The node 100-1 creates a send buffer 113e at the initialization of the MPI library. In addition, the node 100-1 creates 35 receive buffers corresponding one-to-one to the processes of ranks #0 and #2 to #35 assigned to the nodes except the node 100-1. A receive buffer 115d corresponds to the rank #0, a receive buffer 115e corresponds to the rank #2, and a receive buffer 15f corresponds to the rank #35.

A process 111e of rank #35 is assigned to the node 100-35. The node 100-35 creates a send buffer 113f at the initialization of the MPI library. In addition, the node 100-35 creates 35 receive buffers corresponding one-to-one to the processes of ranks #0 to #34 assigned to the nodes except the node 100-35 at the initialization of the MPI library. A receive buffer 115g corresponds to the rank #0, a receive buffer 115h corresponds to the rank #1, and a receive buffer 15i corresponds to the rank #34.

It is uncertain at the initialization of the MPI library which process sends a message to which process in the parallel processing. Therefore, in order to enable direct transmission of a message from one process to another, as illustrated in FIGS. 4 and 5, each node needs to create a great number of receive buffers in the RAM, as illustrated in FIG. 6. For example, if the size of each receive buffer is 2 kB and the number of processes are one million, each node uses about 2 GB memory area for the receive buffers. To deal with this, the parallel processing apparatus of the second embodiment groups a plurality of nodes to be used to perform parallel processing in order to limit the routes for message transmission, thereby reducing the number of receive buffers in the RAM of each node.

FIG. 7 illustrates an example of how to calculate a group identifier and an intra-group identifier.

The parallel processing apparatus calculates a group identifier grp_id and an intra-group identifier id of each process from the rank of the process. $grp\_id = rank/N_{ppg}$ and $id = mod(rank, N_{ppg})$. That is, "grp_id" is a quotient (rounded down to the nearest whole digit) obtained by dividing a rank value by "$N_{ppg}$," and "id" is a remainder obtained by dividing the rank value by "$N_{ppg}$." "$N_{ppg}$" denotes the number of processes per group. In the second embodiment, one process is assigned to one node, and therefore "$N_{ppg}$" may be considered to denote the number of nodes per group. In addition, "$N_{ppg}$" is defined as a fixed value in the MPI library, for example. However, it may be so designed as to allow the user to specify "$N_{ppg}$" as an option for an environmental variable or execution command.

Processes with the same group identifier grp_id belong to the same group. In the second embodiment, one process is assigned to one node. Therefore, it may be said that nodes assigned processes having the same group identifier grp_id belong to the same group. In addition, for a certain process, another process that has a different group identifier grp_id but has the same intra-group identifier id is a "partner process." In the second embodiment, one process is assigned to one node. Therefore, it may be said that, for a certain node assigned a process, another node assigned another process that has a different group identifier grp_id but has the same intra-group identifier id is a "partner node."

In this example, consider the case where $N_{ppg}=9$ and the processes of ranks #0 to #35 assigned to the nodes 100, 100-1, ..., 100-35 are divided into four groups. A group 41 (#0) is made up of a set of processes with grp_id=0, that is, the processes of ranks #0 to #8 assigned to the nodes 100, 100-1, ..., 100-8. A group 42 (#1) is made up of a set of processes with grp_id=1, that is, the processes of ranks #9 to #17 assigned to the nodes 100-9, ..., 100-17. A group 43 (#2) is made up of a set of processes with grp_id=2, that is, the processes of ranks #18 to #26 assigned to the nodes 100-18, ..., 100-26. A group 44 (#3) is made up of a set of processes with grp_id=3, that is, the processes of ranks #27 to #35 assigned to the nodes 100-27, ..., 100-35.

Figure 8:
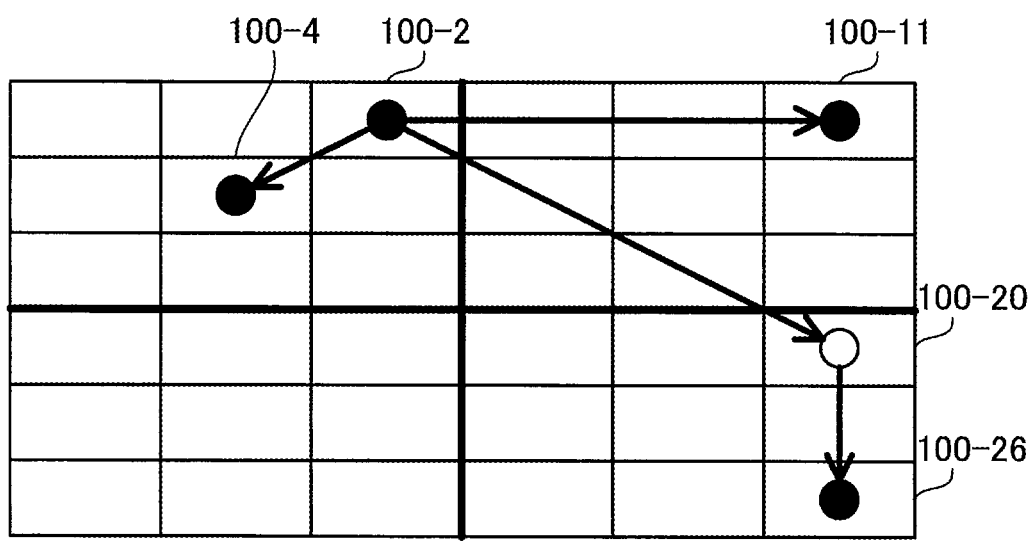
FIG. 8 illustrates an example of communication routes.

FIG. 8 illustrates an example of communication routes.

The parallel processing apparatus limits destination processes to which a certain process is able to directly send messages, to processes belonging to the same group as the certain process (i.e., processes with the same group identifier as the certain process) and partner processes that belong to other groups (i.e., processes with the same intra-group identifier as the certain process). This means that the process sends a message to a process (i.e., a process with a different group identifier and a different intra-group identifier) other than a partner process in another group, via the partner process.

For example, the node 100-2 assigned the process 111a of rank #2 is able to send messages directly to the node 100-4 assigned the process of rank #4 because the destination belongs to the same group. In addition, the node 100-2 is able to send messages directly to the node 100-11 assigned the process of rank #11 because the destination is a partner process.

However, the node 100-2 is not able to send messages directly to the node 100-26 assigned the process 111b of rank #26 because the destination does not belong to the same group or is not a partner process. In this case, the node 100-2 finds the process of rank #20, which is a partner process in the same group as the destination process, and sends the messages to the node 100-20 assigned the process of rank #20. The node 100-20 transfers the messages received from the node 100-2, to the node 100-26.

The limiting of transmission routes for messages in the above manner makes it possible to reduce the number of receive buffers.

Figure 9:
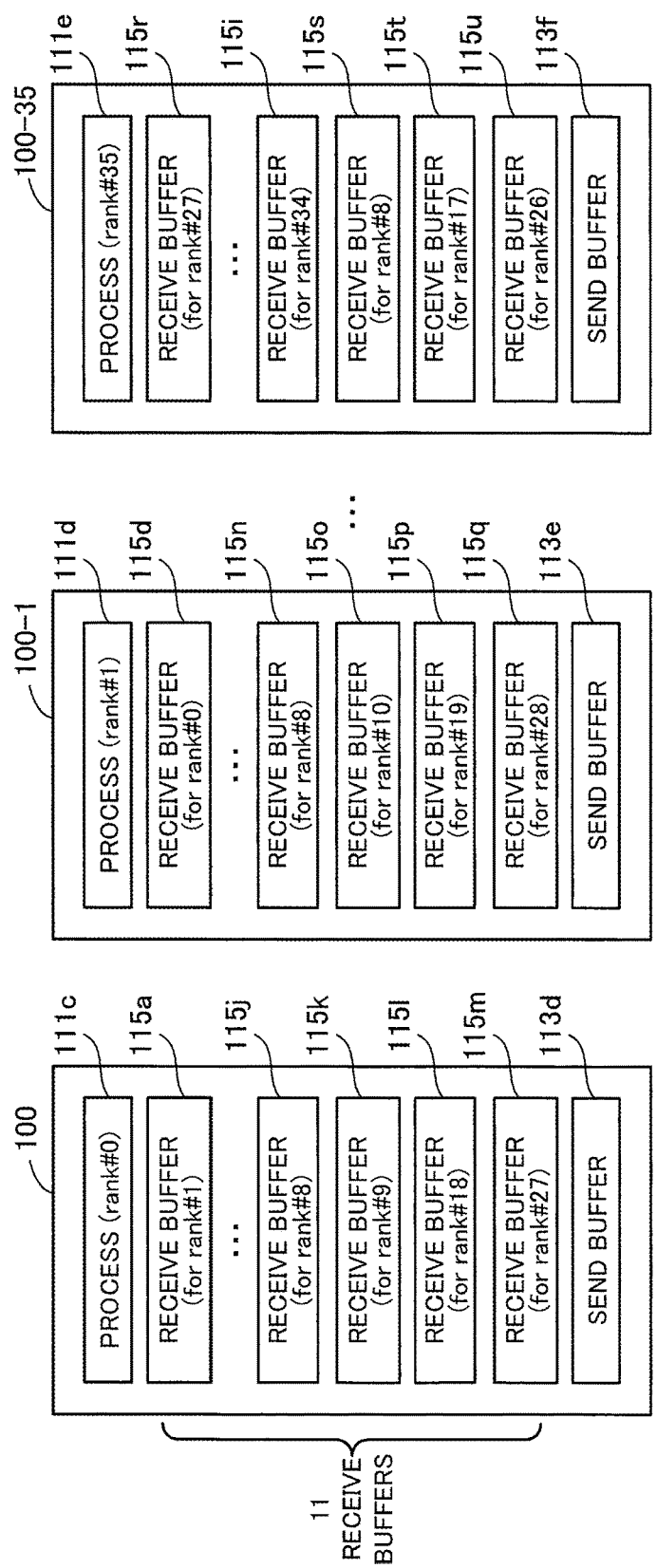
FIG. 9 illustrates a second example of buffer arrangement.

FIG. 9 illustrates a second example of buffer arrangement.

The process 111c of rank #0 is assigned to the node 100. The node 100 creates a send buffer 113d at the initialization of the MPI library. Further, the node 100 creates eight receive buffers corresponding one-to-one to the processes of ranks #1 to #8, which belong to the same group, at the initialization of the MPI library. Still further, the node 100 creates three receive buffers corresponding one-to-one to the processes of ranks #9, #18, and #27, which are partner processes in the other groups. A receive buffer 115j corresponds to the rank #8, a receive buffer 115k corresponds to the rank #9, a receive buffer 115l corresponds to the rank #18, and a receive buffer 115m corresponds to the rank #27.

The process 111d of rank #1 is assigned to the node 100-1. The node 100-1 creates a send buffer 113e at the initialization of the MPI library. Further, the node 100-1 creates eight receive buffers corresponding one-to-one to the processes of ranks #0 and #2 to #8, which belong to the same group, at the initialization of the MPI library. Still further, the node 100-1 creates three receive buffers corresponding one-to-one to the processes of ranks #10, #19, and #28, which are partner processes in the other groups. A receive buffer 115n corresponds to the rank #8, a receive buffer 115o corresponds to the rank #10, a receive buffer 115p corresponds to the rank #19, and a receive buffer 115q corresponds to the rank #28.

The process 111e of rank #35 is assigned to the node 100-35. The node 100-35 creates a send buffer 113f at the initialization of the MPI library. Further, the node 100-35 creates eight receive buffers corresponding one-to-one to the processes of ranks #27 to 34, which belong to the same group, at the initialization of the MPI library. Still further, the node 100-35 creates three receive buffers corresponding one-to-one to the processes of ranks #8, #17, and #26, which are partner processes in the other groups. A receive buffer 115r corresponds to the rank #27, a receive buffer 115s corresponds to the rank #8, a receive buffer 115t corresponds to the rank #17, and a receive buffer 115u corresponds to the rank #26.

As described above, the number of receive buffers created in each node is equal to the sum of the number of processes belonging to the same group among the processes assigned to the other nodes and the number of other groups. Referring to the example of FIG. 9, the number of processes belonging to the same group among the processes assigned to the other nodes is calculated as $N_{ppg}-1=8$, and the number of other groups is three. Therefore, the number of receive buffers created in each node 100, 100-1, . . . , 100-35 is calculated to be 11. This achieves a reduction in the number of receive buffers created in each node, compared with the case of FIG. 6.

Note that in FIGS. 7 and 8, the total number of processes is dividable by $N_{ppg}$. However, it is possible to limit the transmission routes for messages even in the case where the total number of processes is not dividable by $N_{ppg}$.

Figure 10:
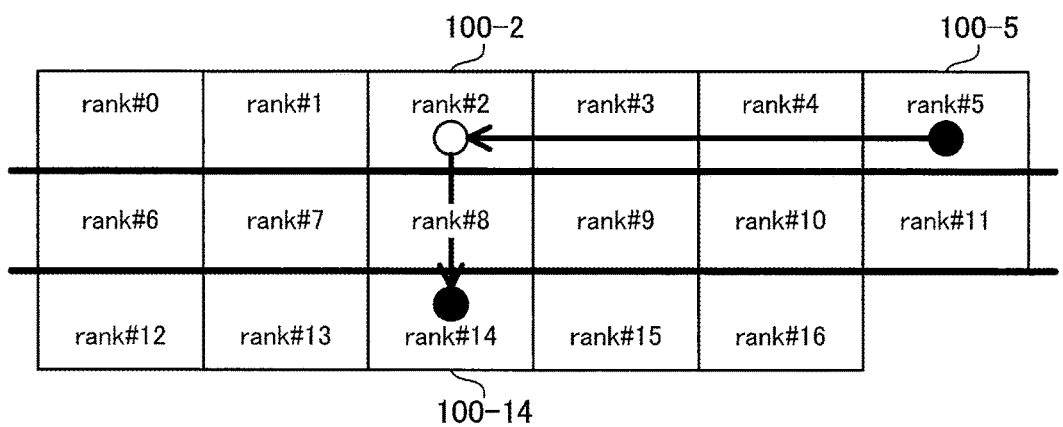
FIG. 10 illustrates another example of communication routes.

FIG. 10 illustrates another example of communication routes.

The following describes the case where processes of ranks #0 to #16 are assigned to 17 nodes (nodes 100, 100-1, . . . , 100-16), and $N_{ppg}=6$. The processes of ranks #0 to #5 belong to a group #0, the processes of ranks #6 to #11 belong to a group #1, and the processes of ranks #12 to #16 belong to a group #2. Since the total number of processes is not dividable by $N_{ppg}$, the number of processes belonging to the group #2 is $N_{ppg}-1=5$.

When the process of rank #5 intends to send a message to the process of rank #14 in the same manner as described with reference to FIG. 8, there is no partner process for the process of rank #5 in the group #2. That is, the group #2 does not have a process with the same intra-group identifier of 5 as the process of rank #5.

In the case where a partner process does not exist, the parallel processing apparatus determines a partner process of the destination process among the processes belonging to the same group as the sender process, as a relay process. In this example, the node 100-5 assigned the process of rank #5 detects the process of rank #2, which is a partner process of the destination process among the processes belonging to the group #0, and sends the message to the node 100-2 assigned the process of rank #2. The node 100-2 transfers the message received from the node 100-5, to the node 100-14 assigned the process of rank #14.

The following describes indirect eager communication and indirect rendezvous communication in the case where a relay process is used. Note that the parallel processing apparatus of the second embodiment is able to select one of two types of methods, to be described later, as the rendezvous communication.

Figure 11:
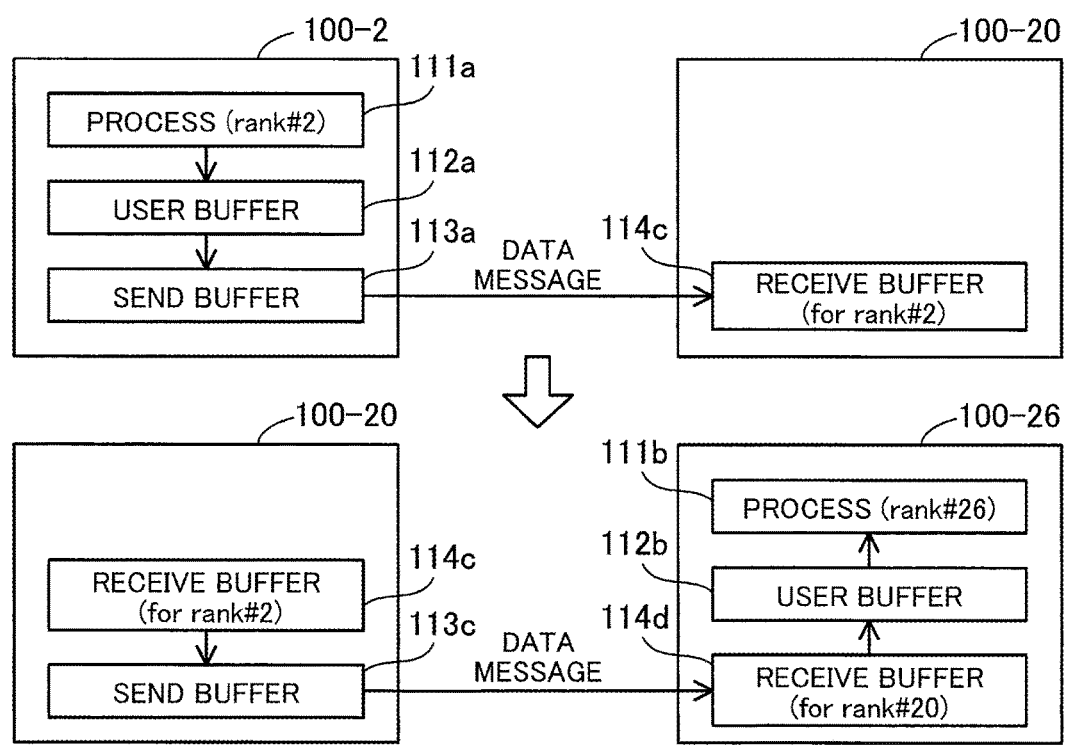
FIG. 11 illustrates an example of indirect eager communication.

FIG. 11 illustrates an example of indirect eager communication.

In this example, consider the case where the node 100-2 sends a data payload to the node 100-26 via the node 100-20 with the eager communication.

A send buffer 113a is created in the RAM of the node 100-2 at the initialization of the MPI library. In addition, a user buffer 112a is dynamically created in the RAM of the node 100-2. A data payload is written in the user buffer 112a by the process 111a. Then, the node 100-2 generates a data message by appending a header to the data payload stored in the user buffer 112a, and writes the data message in the send buffer 113a. The node 100-2 sends the data message stored in the send buffer 113a to a receive buffer 114c of the node 100-20.

A send buffer 113c and the receive buffer 114c for rank #2 are created in the RAM of the node 100-20 at the initialization of the MPI library. When the data message arrives at the receive buffer 114c, the node 100-20 appropriately rewrites the header of the data message, and writes the data message with the header rewritten, in the send buffer 113c. The node 100-20 sends the data message stored in the send buffer 113c to a receive buffer 114d of the node 100-26.

The receive buffer 114d for rank #20 is created in the RAM of the node 100-26 at the initialization of the MPI library. In addition, a user buffer 112b is dynamically created in the RAM of the node 100-26. When the data message arrives at the receive buffer 114d, the node 100-26 extracts the data payload from the data message, and writes the extracted data payload in the user buffer 112b. The process 111b reads the data payload from the user buffer 112b.

Figure 12:
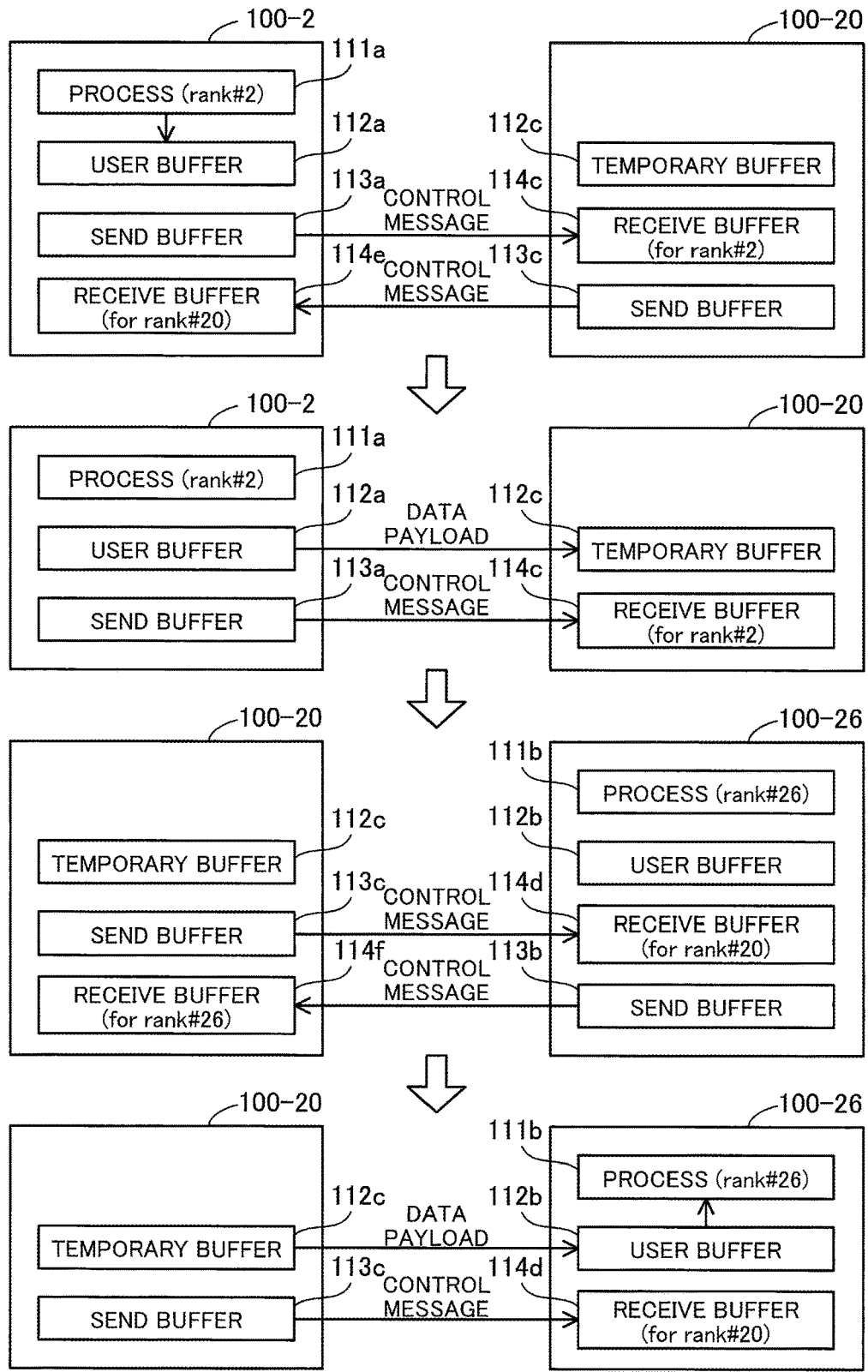
FIG. 12 illustrates a first example of indirect rendezvous communication.

FIG. 12 illustrates a first example of indirect rendezvous communication.

In this example, consider the case where the node 100-2 sends a data payload to the node 100-26 via the node 100-20 with rendezvous communication.

A send buffer 113a and a receive buffer 114e for rank #20 are created in the RAM of the node 100-2 at the initialization of the MPI library. In addition, a user buffer 112a is dynamically created in the RAM of the node 100-2. A data payload is written in the user buffer 112a by the process 111a. Then, the node 100-2 generates a request control message indicating the start of rendezvous communication and writes the request control message in the send buffer 113a. The node 100-2 sends the request control message stored in the send buffer 113a to a receive buffer 114c of the node 100-20.

A send buffer 113c, the receive buffer 114c for rank #2, and a receive buffer 114f for rank #26 are created in the RAM of the node 100-20 at the initialization of the MPI library. When the request control message arrives at the receive buffer 114c, the node 100-20 creates a temporary buffer 112c in the RAM. Although the temporary buffer 112c has a larger size than the receive buffer 114c, it does not need to be recognized by the user program. The node 100-20 generates a response control message indicating a response to the request control message and writes the response control message in the send buffer 113c. The response control message includes the address of the temporary buffer 112c. The node 100-20 sends the response control message stored in the send buffer 113c to the receive buffer 114e of the node 100-2.

When the response control message arrives at the receive buffer 114e, the node 100-2 sends the data payload stored in the user buffer 112a to the temporary buffer 112c specified in the response control message. When the transmission of the data payload is complete, the node 100-2 generates a completion control message indicating the completion of the transmission and writes the completion control message in the send buffer 113a. The node 100-2 sends the completion control message stored in the send buffer 113a to the receive buffer 114c of the node 100-20.

When the completion control message arrives at the receive buffer 114c, the node 100-20 generates a request control message indicating the start of the rendezvous communication and writes the request control message in the send buffer 113c. The node 100-20 sends the request control message stored in the send buffer 113c to a receive buffer 114d of the node 100-26.

A send buffer 113b and the receive buffer 114d for rank #20 are created in the RAM of the node 100-26 at the initialization of the MPI library. In addition, a user buffer 112b is dynamically created for obtaining a data payload by the process 111b in the RAM of the node 100-26. When the request control message arrives at the receive buffer 114d, the node 100-26 generates a response control message indicating a response to the request control message and writes the response control message in the send buffer 113b. The response control message includes the address of the user buffer 112b. The node 100-26 sends the response control message stored in the send buffer 113b to the receive buffer 114f of the node 100-20.

When the response control message arrives at the receive buffer 114f, the node 100-20 sends the data payload stored in the temporary buffer 112c to the user buffer 112b specified in the response control message. When the transmission of the data payload is complete, the node 100-20 generates a completion control message indicating the completion of the transmission and writes the completion control message in the send buffer 113c. The node 100-20 sends the completion control message stored in the send buffer 113c to the receive buffer 114d of the node 100-26. The process 111b reads the data payload from the user buffer 112b.

The following describes another method for the rendezvous communication.

Figure 13:
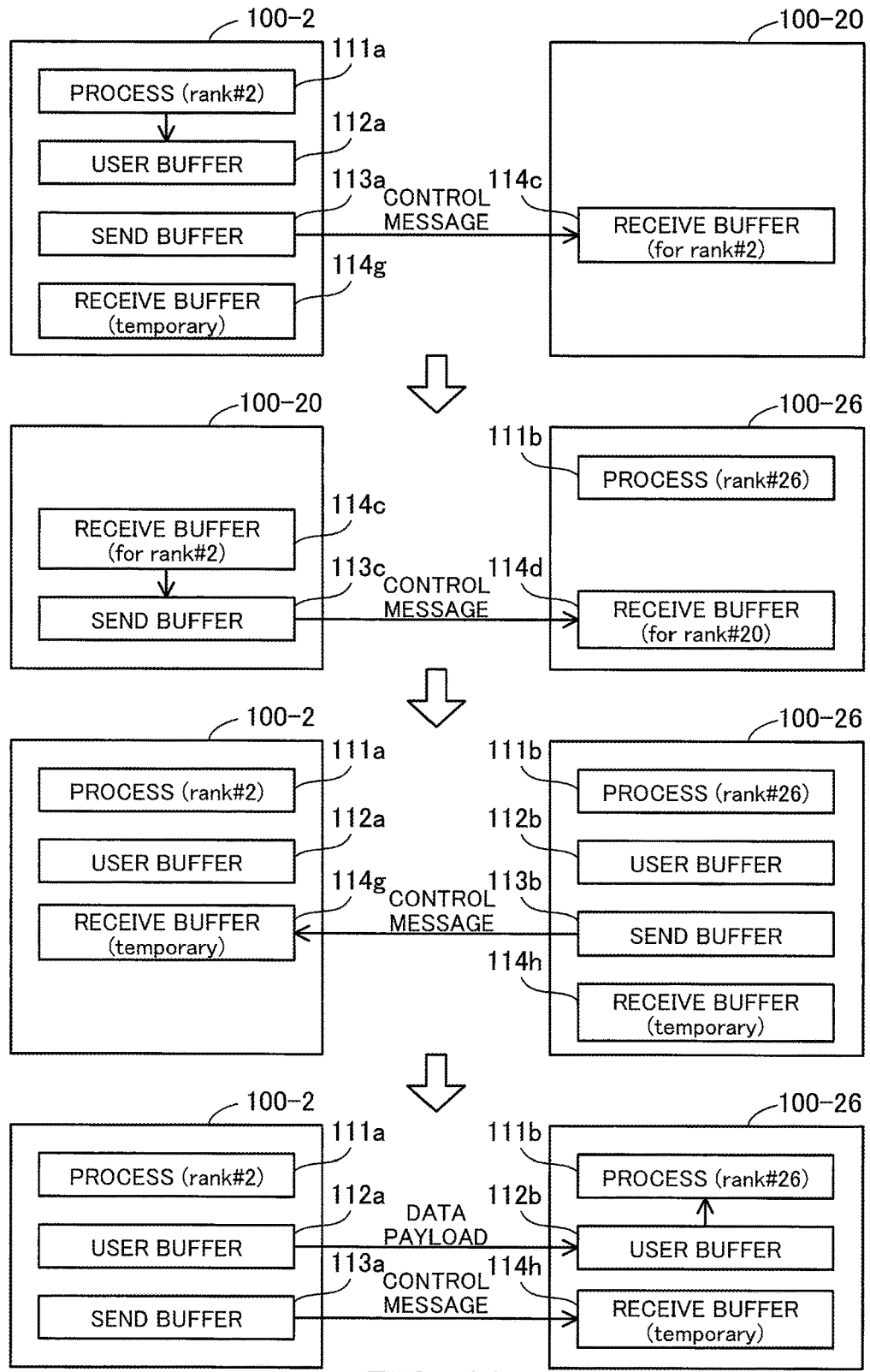
FIG. 13 illustrates a second example of indirect rendezvous communication.

FIG. 13 illustrates a second example of indirect rendezvous communication.

In the above-described first rendezvous communication method, a relay node transfers a data payload sent from an original sender node (start point node) to a final destination node (end point node). The second rendezvous communication method is designed so that a relay node transfers only a request control message and a start point node sends the subsequent response control messages, data payload, and completion control message directly to an end point node.

A send buffer 113a is created in the RAM of the node 100-2 at the initialization of the MPI library. In addition, a user buffer 112a is dynamically created in the RAM of the node 100-2. A data payload is written in the user buffer 112a by the process 111a. Then, the node 100-2 creates a temporary receive buffer 114g in the RAM. The node 100-2 generates a request control message indicating the start of rendezvous communication and writes the request control message in the send buffer 113a. The request control message includes the address of the receive buffer 114g. The node 100-2 sends the request control message stored in the send buffer 113a to a receive buffer 114c of the node 100-20.

A send buffer 113c and the receive buffer 114c for rank #2 are created in the RAM of the node 100-20 at the initialization of the MPI library. When the request control message arrives at the receive buffer 114c, the node 100-20 appropriately rewrites partial content of the request control message, and writes the resultant request control message in the send buffer 113c. The node 100-20 sends the request control message stored in the send buffer 113c to a receive buffer 114d of the node 100-26.

A send buffer 113b and the receive buffer 114d for rank #20 are created in the RAM of the node 100-26 at the initialization of the MPI library. In addition, a user buffer 112b is dynamically created for obtaining a data payload by the process 111b in the RAM of the node 100-26. When the request control message arrives at the receive buffer 114d, the node 100-26 creates a temporary receive buffer 114h in the RAM. The node 100-26 generates a response control message indicating a response to the request control message and writes the response control message in the send buffer 113b. The response control message includes the address of the user buffer 112b and the address of the receive buffer 114h. The node 100-26 sends the response control message stored in the send buffer 113b to the receive buffer 114g of the node 100-2 specified in the request control message.

When the response control message arrives at the receive buffer 114g, the node 100-2 sends the data payload stored in the user buffer 112a to the user buffer 112b specified in the response control message. When the transmission of the data payload is complete, the node 100-2 generates a completion control message indicating the completion of the transmission and writes the completion control message in the send buffer 113a. The node 100-2 sends the completion control message stored in the send buffer 113a to the receive buffer 114h specified in the response control message. The process 111b reads the data payload from the user buffer 112b.

The following describes formats of messages.

Figure 14:
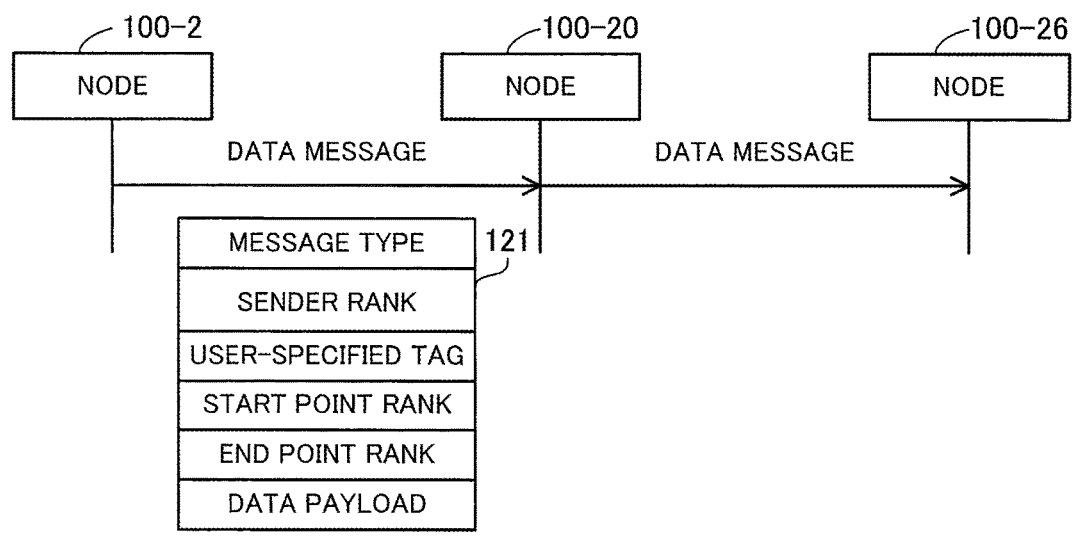
FIG. 14 is a first view illustrating an example of a message format.

FIG. 14 is a first view illustrating an example of a message format.

A data message 121 is sent from the node 100-2 serving as a start point node to the node 100-20 serving as a relay node. The data message 121 includes a message type, a sender rank, a user-specified tag, a start point rank, an end point rank, and a data payload.

The message type indicates that the type of the message is a data message. The sender rank indicates the direct sender of the data message 121, and in this example, is rank #2. The user-specified tag is desirably set by the user program to distinguish among a plurality of messages. The start point rank indicates the original sender of the eager communication, and in this example, is rank #2. The end point rank indicates the final destination of the eager communication, and in this example, is rank #26.

A data message in the same format as the data message 121 is sent from the node 100-20 serving as the relay node to the node 100-26 serving as an end point node. In this data message, the sender rank has been rewritten from rank #2 to rank #20, and the start point rank and end point rank are the same as those in the data message 121. That is, even when the node 100-20 relays the eager communication, the start point rank remains as rank #2, and the end point rank remains as rank #26.

Figure 15:
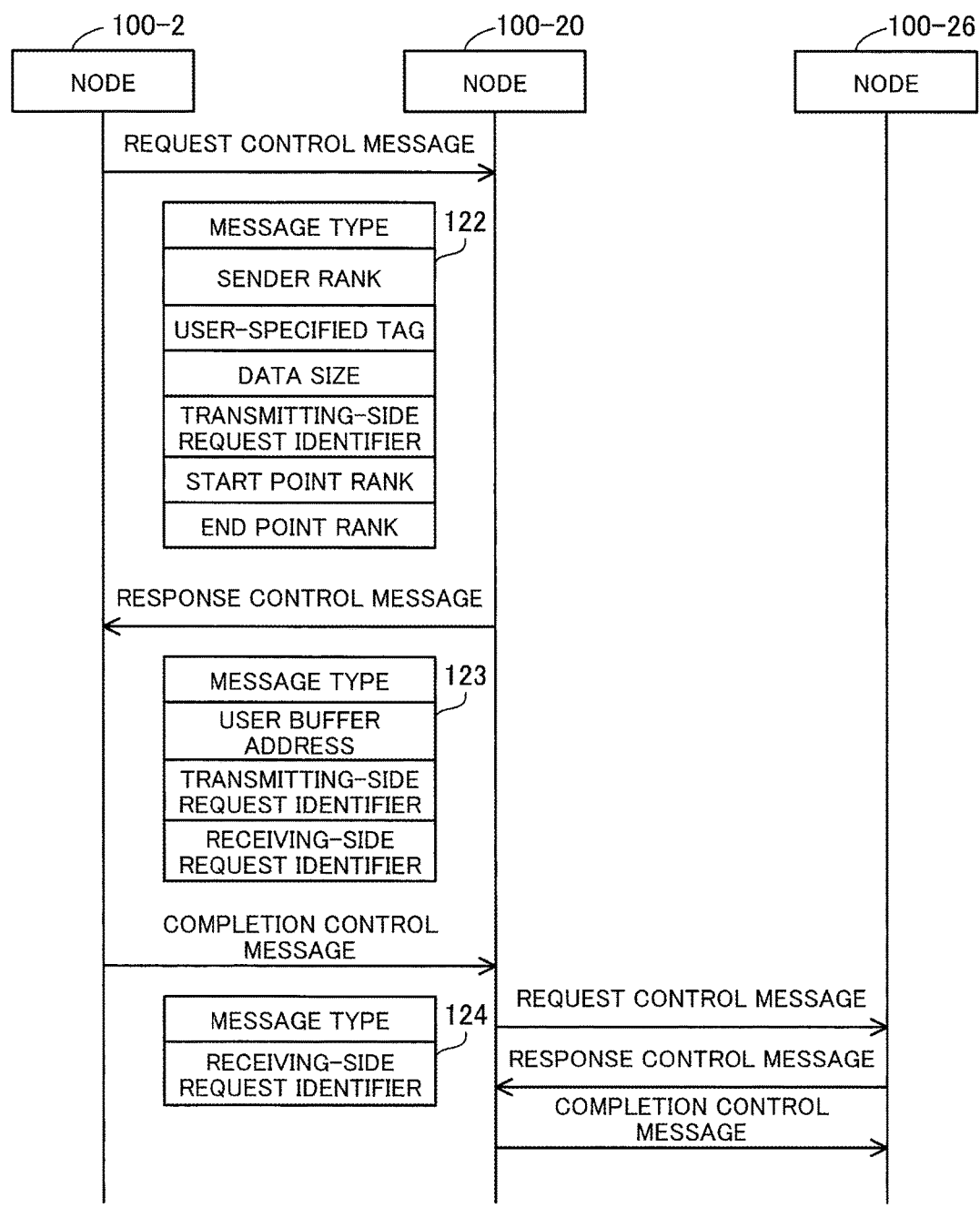
FIG. 15 is a second view illustrating an example of message formats.

FIG. 15 is a second view illustrating an example of message formats.

In the first rendezvous communication method, a request control message 122 is sent from the node 100-2 serving as a start point node to the node 100-20 serving as a relay node. The request control message 122 includes a message type, a sender rank, a user-specified tag, a data size, a transmitting-side request identifier, a start point rank, and an end point rank.

The message type indicates that the type of the message is a request control message. The sender rank indicates the direct sender of the request control message 122, and in this example, is rank #2. The user-specified tag is desirably set by the user program in order to distinguish among a plurality of messages. The data size indicates the size of a data payload to be sent from the node 100-2 in the rendezvous communication. The transmitting-side request identifier is an identifier given by the node 100-2 in order to identify the rendezvous communication. The start point rank indicates the original sender of the rendezvous communication, and in this example, is rank #2. The end point rank indicates the final destination of the rendezvous communication and in this example, is rank #26.

A response control message 123 is sent from the node 100-20 serving as the relay node to the node 100-2 serving as the start point node. The response control message 123 includes a message type, a user buffer address, a transmitting-side request identifier, and a receiving-side request identifier.

The message type indicates that the type of the message is a response control message. The user buffer address indicates the address of a buffer for the node 100-20 to receive a data payload. In this connection, the node 100-20 is a relay node, and therefore the buffer for receiving a data payload is the temporary buffer 112c temporarily created in the node 100-20. The transmitting-side request identifier is the identifier included in the request control message 122. The receiving-side request identifier is an identifier given by the node 100-20 to identify the rendezvous communication.

A completion control message 124 is sent from the node 100-2 serving as the start point node to the node 100-20 serving as the relay node. The completion control message 124 includes a message type and a receiving-side request identifier.

The message type indicates that the type of the message is a completion control message. The receiving-side request identifier is the identifier included in the response control message 123.

A request control message in the same format as the request control message 122 is sent from the node 100-20 serving as the relay node to the node 100-26 serving as an end point node. In addition, a response control message in the same format as the response control message 123 is sent from the node 100-26 serving as the end point node to the node 100-20 serving as the relay node. A completion control message in the same format as the completion control message 124 is sent from the node 100-20 serving as the relay node to the node 100-26 serving as the end point node. The sender rank, transmitting-side request identifier, receiving-side request identifier, and user buffer address in these control messages are appropriately set by the nodes 100-20 and 100-26.

Figure 16:
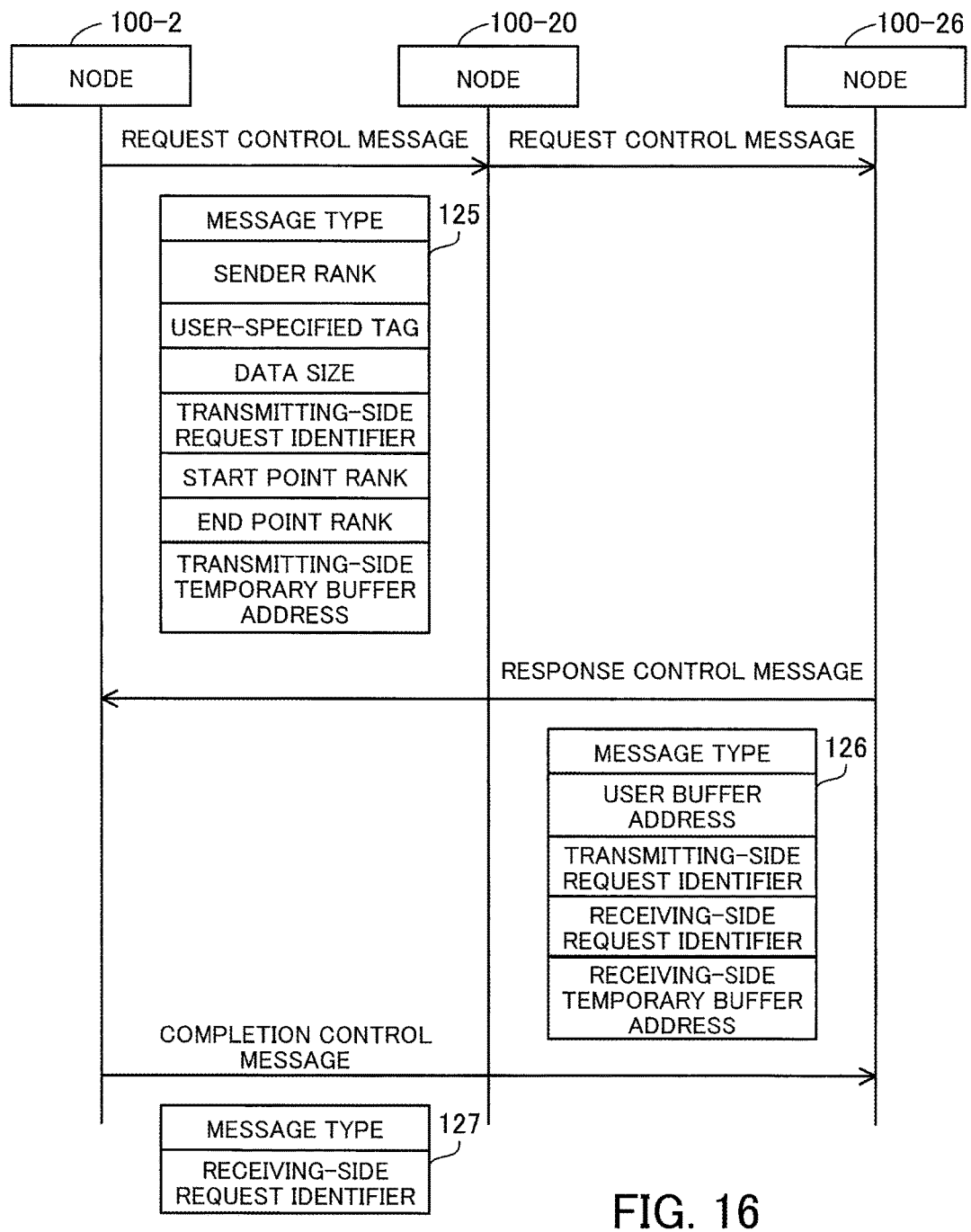
FIG. 16 is a third view illustrating an example of message formats.

FIG. 16 is a third view illustrating an example of message formats.

In the second rendezvous communication method, a request control message 125 is sent from the node 100-2 serving as a start point node to the node 100-20 serving as a relay node. The request control message 125 includes a message type, a sender rank, a user-specified tag, a data size, a transmitting-side request identifier, a start point rank, an end point rank, and a transmitting-side temporary buffer address. The message type, sender rank, user-specified tag, data size, transmitting-side request identifier, start point rank, and end point rank have the same definition as those included in the request control message 122. The transmitting-side temporary buffer address is the address of the receive buffer 114g temporarily created in the node 100-2 for receiving a response control message.

A request control message in the same format as the request control message 125 is sent from the node 100-20 serving as the relay node to the node 100-26 serving as an end point node. In principle, the content of the request control message 125 is transferred to the node 100-26. However, the sender rank has been rewritten from rank #2 to rank #20 in this request control message.

A response control message 126 is sent from the node 100-26 serving as the end point node to the node 100-2 serving as the start point node, not via the node 100-20. The response control message 126 includes a message type, a user buffer address, a transmitting-side request identifier, a receiving-side request identifier, and a receiving-side temporary buffer address.

The message type has the same definition as that included in the response control message 123. The user buffer address is the address of the user buffer 112b created in the node 100-26 for receiving a data payload. The transmitting-side request identifier is the identifier given by the node 100-2 and included in the request control message 125. The receiving-side request identifier is an identifier given by the node 100-26 to identify the rendezvous communication. The receiving-side temporary buffer address is the address of the receive buffer 114h temporarily created in the node 100-26 for receiving a completion control message.

A completion control message 127 is sent from the node 100-2 serving as the start point node to the node 100-26 serving as the end point node, not via the node 100-20. The completion control message 127 includes a message type and a receiving-side request identifier. The message type and receiving-side request identifier have the same definition as those included in the completion control message 124.

The following describes functions of each node.

Figure 17:
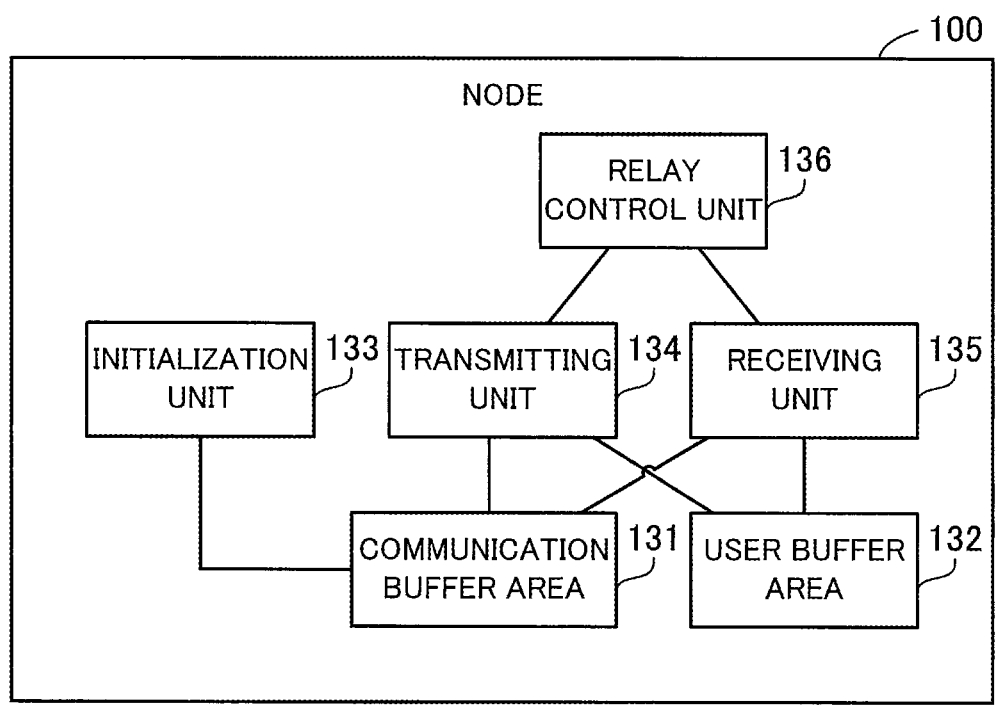
FIG. 17 is a block diagram illustrating an example of functions of a node.

FIG. 17 is a block diagram illustrating an example of functions of a node.

The node 100 includes a communication buffer area 131, a user buffer area 132, an initialization unit 133, a transmitting unit 134, a receiving unit 135, and a relay control unit 136. The communication buffer area 131 and user buffer area 132 are implemented by using the storage space of the RAM 102. The initialization unit 133, transmitting unit 134, receiving unit 135, and relay control unit 136 are implemented by using program modules that are executed by the CPU 101, for example. The other nodes have the same module configuration as the node 100.

In the communication buffer area 131, buffers that are used for inter-node communication and are not recognized by the user program are created. The communication buffer area 131 includes one send buffer for temporarily storing messages to be sent and a plurality of receive buffers for temporarily storing received messages, for one process assigned to the node 100. In addition, in the communication buffer area 131, a temporary buffer may be created for relaying a data payload in rendezvous communication. In the user buffer area 132, a buffer that is recognized by the user program is created. The user buffer area 132 includes a user buffer for storing data payloads to be sent or data payloads received.

The initialization unit 133 initializes an MPI library at the start of parallel processing. The initialization unit 133 creates a send buffer in the communication buffer area 131. In addition, the initialization unit 133 specifies processes to be involved in the parallel processing, and detects processes belonging to the same group and partner processes belonging to the other groups, on the basis of the ranks of processes. The initialization unit 133 creates individual receive buffers corresponding one-to-one to the detected processes of the same group and the detected partner processes of the other groups, in the communication buffer area 131. There is no need to create receive buffers corresponding to the other processes in the communication buffer area 131.

The transmitting unit 134 sends messages and data payloads. The transmitting unit 134 reads a data payload from a specified user buffer of the user buffer area 132 in response to a request for eager communication from a process assigned to the node 100, and generates a data message. In addition, the transmitting unit 134 obtains an arriving data message in response to a request for eager communication from the relay control unit 136, and rewrites the header of the data message. The transmitting unit 134 writes the generated data message in the send buffer in the communication buffer area 131, and sequentially sends messages stored in the send buffer.

In addition, the transmitting unit 134 generates various kinds of control messages in response to requests for rendezvous communication from the process assigned to the node 100 or the relay control unit 136. The transmitting unit 134 writes the generated control messages in the send buffer of the communication buffer area 131, and sequentially sends messages stored in the send buffer. In addition, the transmitting unit 134 reads a data payload from a specified user buffer of the user buffer area 132 in response to a request from the process assigned to the node 100, and sends the data payload. In addition, the transmitting unit 134 may read a data payload from s specified temporary buffer of the communication buffer area 131 in response to a request for rendezvous communication from the relay control unit 136, and send the data payload.

The receiving unit 135 receives messages and data payloads. The receiving unit 135 monitors the receive buffers in the communication buffer area 131, and reads a data message from a receive buffer when the data message arrives. In the case where the end point rank is the rank of the process assigned to the node 100, the receiving unit 135 writes the data payload included in the data message in the user buffer of the user buffer area 132. In the case where the end point rank is not the rank of the process assigned to the node 100, the receiving unit 135 notifies the relay control unit 136 of the content of the data message.

In addition, the receiving unit 135 monitors the receive buffers in the communication buffer area 131, and reads a control message from a receive buffer when the control message arrives. The receiving unit 135 notifies the transmitting unit 134 or the relay control unit 136 of the content of the control message.

The relay control unit 136 controls the relay of messages and data payloads. When the relay control unit 136 detects eager communication in which the node 100 serves as a relay node, the relay control unit 136 determines a process with the end point rank, and instructs the transmitting unit 134 to send a data message for the end point rank. In addition, when detecting rendezvous communication in which the node 100 serves as a relay node, the relay control unit 136 determines a process with the end point rank, and instructs the transmitting unit 134 to send a control message for the end point rank. In the first rendezvous communication method, the relay control unit 136 instructs the transmitting unit 134 to transfer a data payload.

The following describes how each node operates. In the following, the operational procedure of the node 100 will be described as a representative, and the other nodes operate in the same way as the node 100.

Figure 18:
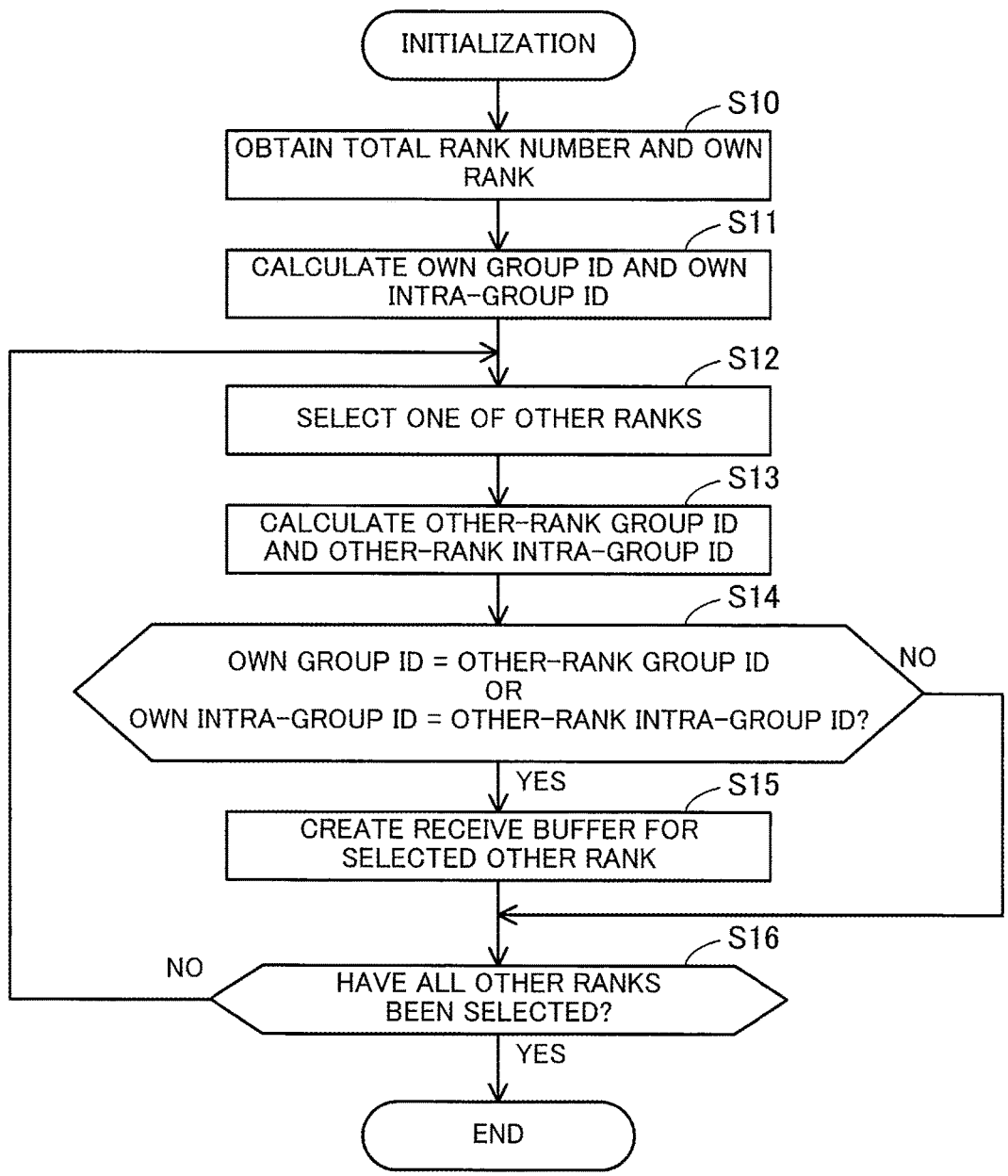
FIG. 18 is a flowchart illustrating an example of a procedure for initialization.

FIG. 18 is a flowchart illustrating an example of a procedure for initialization.

(S10) The initialization unit 133 obtains the total number (total rank number) of processes involved in parallel processing, and the rank (own rank) of a process 111c assigned to the node 100. The total rank number and own rank are determined based on the definitions described in the user program, inter-node communication, and others.

(S11) The initialization unit 133 calculates a group identifier (own group ID) and intra-group identifier (own intra-group ID) of the process 111c on the basis of the own rank obtained at step S10. As described earlier, the own group ID is a quotient obtained by dividing the own rank value by $N_{ppg}$, and the own intra-group ID is a remainder obtained by dividing the own rank value by $N_{ppg}$.

(S12) The initialization unit 133 selects one other rank among the ranks (other ranks) of the other processes involved in the parallel processing. Selectable other ranks are ranks each having one of the integers greater than or equal to zero and lower than or equal to the value obtained by subtracting one from the total rank number, except for the own rank.

(S13) The initialization unit 133 calculates a group identifier (other-rank group ID) and an intra-group identifier (other-rank intra-group ID) of the corresponding other process, from the other rank selected at step S12. As described earlier, the other-rank group ID is a quotient obtained by dividing the other rank value by $N_{ppg}$, and the other-rank intra-group ID is a remainder obtained by dividing the other rank value by $N_{ppg}$.

(S14) The initialization unit 133 compares the own group ID of step S11 with the other-rank group ID of step S13, and also compares the own intra-group ID of step S11 with the other-rank intra-group ID of step S13. Then, the initialization unit 133 determines whether the own group ID is the same as the other-rank group ID or the own intra-group ID is the same as the other-rank intra-group ID. If this condition is satisfied, the process proceeds to step S15. If the condition is not satisfied, that is, if the own group ID is different from the other-rank group ID and the own intra-group ID is different from the other-rank intra-group ID, the process proceeds to step S16.

(S15) The initialization unit 133 creates a receive buffer for the other rank selected at step S12, in the communication buffer area 131.

(S16) The initialization unit 133 determines whether all the other ranks have been selected at step S12. If all the other ranks have been selected, the initialization is completed. If there is any other rank that has not been selected, the process proceeds to step S12.

Figure 19:
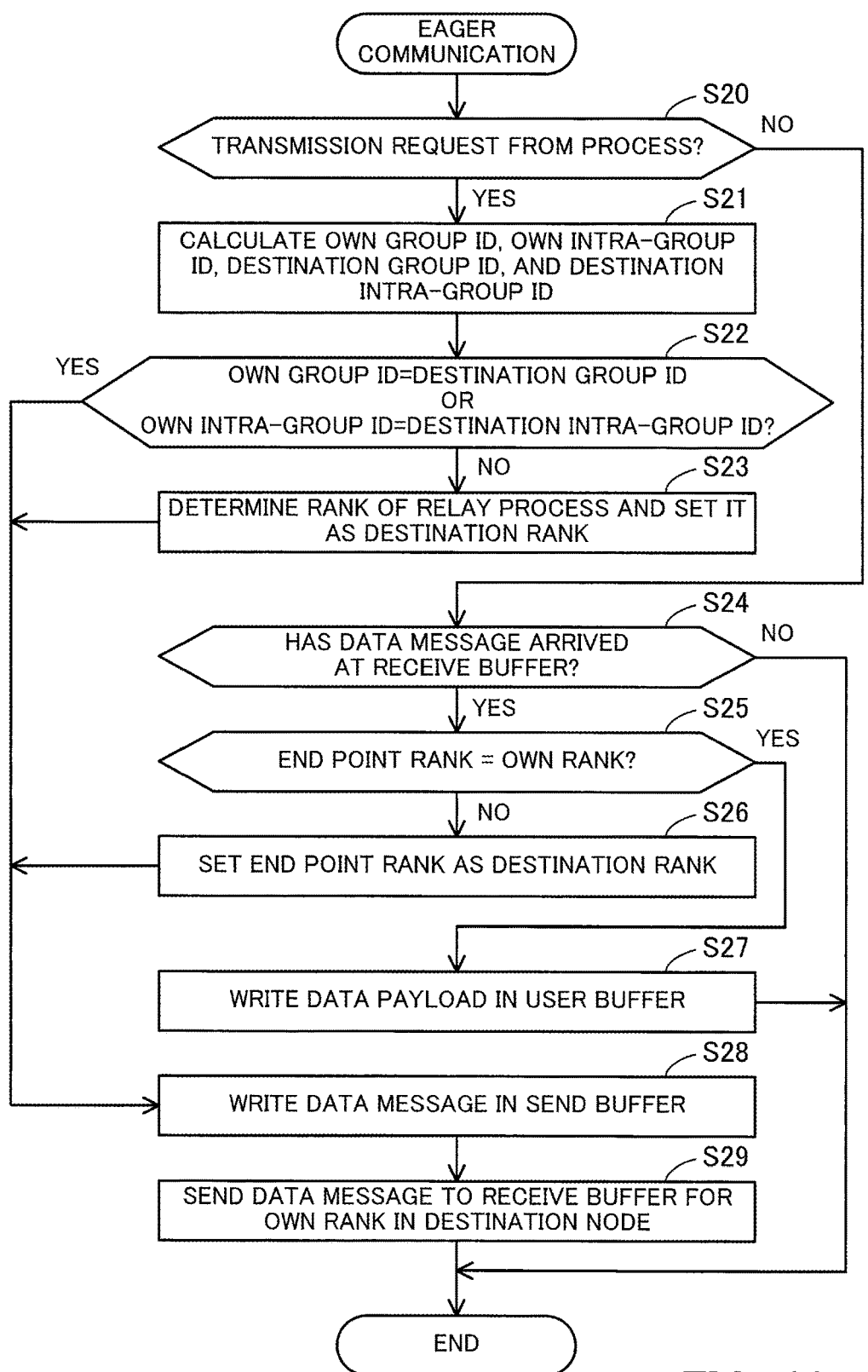
FIG. 19 is a flowchart illustrating an example of a procedure for eager communication.

FIG. 19 is a flowchart illustrating an example of a procedure for eager communication.

(S20) The transmitting unit 134 determines whether a transmission request for a data payload with eager communication has arrived from the process 111c. If the transmission request has arrived, the process proceeds to step S21. Otherwise, the process proceeds to step S24.

(S21) The transmitting unit 134 calculates an own group ID and an own intra-group ID from the own rank of the process 111c. In addition, the transmitting unit 134 calculates a destination group ID and a destination intra-group ID of a destination from the destination rank specified by the process 111c. The destination group ID is calculated in the same way as described earlier for an other-rank group ID, and the destination intra-group ID is calculated in the same way as described earlier for an other-rank intra-group ID.

(S22) The transmitting unit 134 determines whether the own group ID of step S21 is the same as the destination group ID or the own intra-group ID of step S21 is the same as the destination intra-group ID. If this condition is satisfied, the process proceeds to step S28. If the condition is not satisfied, that is, if the own group ID is different from the destination group ID and the own intra-group ID is different from the destination intra-group ID, the process proceeds to step S23.

(S23) The transmitting unit 134 determines the rank of a relay process on the basis of the destination group ID and own intra-group ID. The relay process is a partner process that has the same intra-group ID as the process 111c, among the processes belonging to the same group as the destination process. The rank of the relay process is calculated as follows: "Rank of relay process"="Destination group ID"× "$N_{ppg}$"+"Own intra-group ID". If there is no partner process that satisfies the above condition, the transmitting unit 134 selects a process that has the same intra-group ID as the destination process, as the relay process, from the group to which the process 111c belongs. The transmitting unit 134 sets the rank of the determined relay process as a destination rank. In addition, the transmitting unit 134 sets the destination rank specified by the process 111c as an end point rank. Then, the process proceeds to step S28.

(S24) The receiving unit 135 determines whether a data message has arrived at any receive buffer. If a data message has arrived, the process proceeds to step S25. If no data massage has arrived, the process is completed.

(S25) The receiving unit 135 determines whether the end point rank included in the arriving data message is the own rank. If the end point rank is the own rank, the process proceeds to step S27. If the end point rank is not the own rank, the process proceeds to step S26.

(S26) The relay control unit 136 sets the end point rank as a new destination rank, and instructs the transmitting unit 134 to transfer the data message. Then, the process proceeds to step S28.

(S27) The receiving unit 135 writes the data payload included in the arriving data message in the user buffer. In this connection, the receiving unit 135 has received a reception request for a data payload with eager communication from the process 111c, and the user buffer is specified in the reception request. Then, the process is completed.

(S28) The transmitting unit 134 writes a data message, which is a data payload together with a header appended hereto, in the send buffer 113d. In the case of sending the data message in response to a request from the process 111c, the transmitting unit 134 reads the data payload from the user buffer specified by the process 111c, and appends the header to the data payload. At this time, in the header, the sender rank and start point rank are set to the own rank, and the end point rank is set to the destination rank specified by the process 111c. In the case of transferring the data message, the transmitting unit 134 rewrites the header thereof. At this time, in the header, the sender rank is set to the own rank, and the start point rank and the end point rank remain the same as those included in the original data message.

(S29) The transmitting unit 134 sends the data message stored in the send buffer 113d to the receive buffer for its own rank among the receive buffers provided in the node corresponding to the destination rank (i.e., destination node). The transmitting unit 134 specifies the address of the destination receive buffer at the transmission of the data message. The transmitting unit 134 obtains in advance the address of the receive buffer for its own rank, through inter-node communication that is performed at the initialization of the MPI library. If the own rank is the start point rank and there is no relay process, the destination rank is the end point rank. If the own rank is the start point rank and there is a relay process, the destination rank is the rank of the relay process. If the own rank is not the start point rank, the destination rank is the end point rank.

Figure 20:
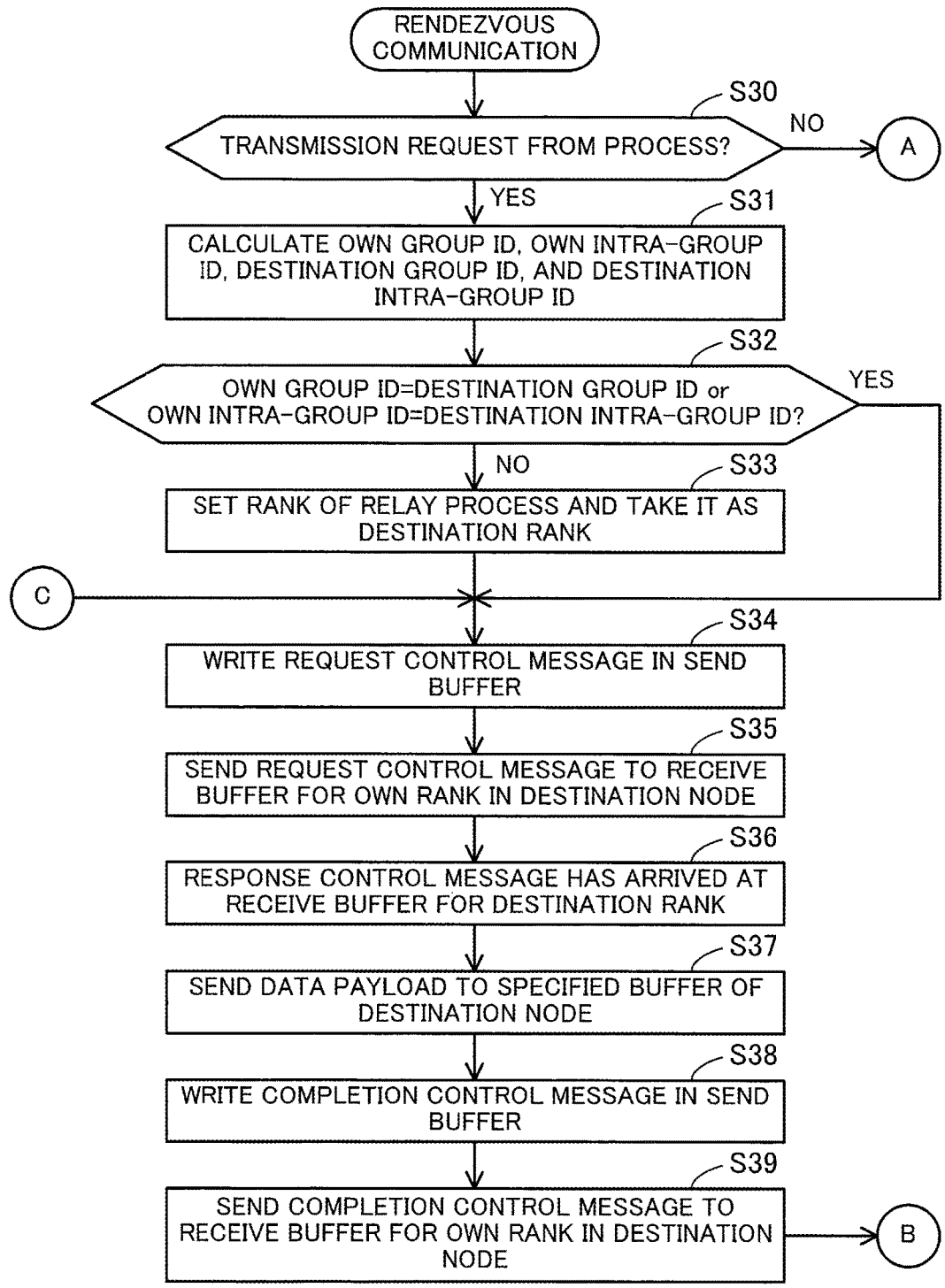
FIG. 20 is a first flowchart illustrating a procedure for rendezvous communication.

FIG. 20 is a first flowchart illustrating a procedure for rendezvous communication.

Here, a first rendezvous communication method will be described.

(S30) The transmitting unit 134 determines whether a transmission request for a data payload with rendezvous communication has arrived from the process 111c. If the transmission request has arrived, the process proceeds to step S31. Otherwise, the process proceeds to step S40.

(S31) The transmitting unit 134 calculates an own group ID and an own intra-group ID from the own rank of the process 111c. In addition, the transmitting unit 134 calculates a destination group ID and a destination intra-group ID from a destination rank specified by the process 111c.

(S32) The transmitting unit 134 determines whether the own group ID of step S31 is the same as the destination group ID or the own intra-group ID of step S31 is the same as the destination intra-group ID. If this condition is satisfied, the process proceeds to step S34. If this condition is not satisfied, that is, if the own group ID is different from the destination group ID and the own intra-group ID is different from the destination intra-group ID, the process proceeds to step S33.

(S33) The transmitting unit 134 determines the rank of a relay process on the basis of the destination group ID and the own intra-group ID. The rank of the relay process is calculated as follows: "Rank of relay process"="Destination group ID"×"$N_{ppg}$"+"Own intra-group ID". If there is no relay process that satisfies the above condition, the transmitting unit 134 selects a process with the same intra-group ID as the destination process, as the relay process, from the group to which the process 111c belongs. The transmitting unit 134 sets the rank of the determined relay process as a destination rank. In addition, the transmitting unit 134 sets the destination rank specified by the process 111c as an end point rank.

(S34) The transmitting unit 134 generates a request control message and writes it in the send buffer 113d. In the request control message, the sender rank is set to the own rank, and the transmitting-side request identifier is set to an identifier specified by the transmitting unit 134. In the case of sending a data payload in response to a request from the process 111c, the start point rank is set to the own rank, and the end point rank is set to the destination rank specified by the process 111c. In the case of transferring the data payload, the start point rank and end point rank remain the same as those included in the original request control message.

(S35) The transmitting unit 134 sends the request control message stored in the send buffer 113d to the receive buffer for its own rank among the receive buffers provided in the destination node corresponding to the destination rank. At this time, if the own rank is the start point rank and there is no relay process, the destination rank is the end point rank. If the own rank is the start point rank and there is a relay process, the destination rank is the rank of the relay process. If the own rank is not the start point rank, the destination rank is the end point rank.

(S36) The receiving unit 135 detects that a response control message has arrived at the receive buffer for the destination rank of step S35.

(S37) The transmitting unit 134 reads a data payload to be sent. If the own rank is the start point rank, the transmitting unit 134 reads the data payload from a user buffer specified by the process 111c. If the own rank is not the start point rank, the transmitting unit 134 reads the data payload to be transferred from a temporary buffer. Then, the transmitting unit 134 sends the data payload to the buffer specified in the response control message of step S36. If the destination rank is the end point rank, the buffer specified in the response control message is a user buffer. If the destination rank is not the end point rank, the buffer specified in the response control message is a temporary buffer.

(S38) The transmitting unit 134 generates a completion control message and writes it in the send buffer 113d. The receiving-side request identifier in the completion control message is the same as that included in the response control message of step S36.

(S39) The transmitting unit 134 sends the completion control message stored in the send buffer 113d to the same receive buffer as in step S35. Then, the process is completed.

Figure 21:
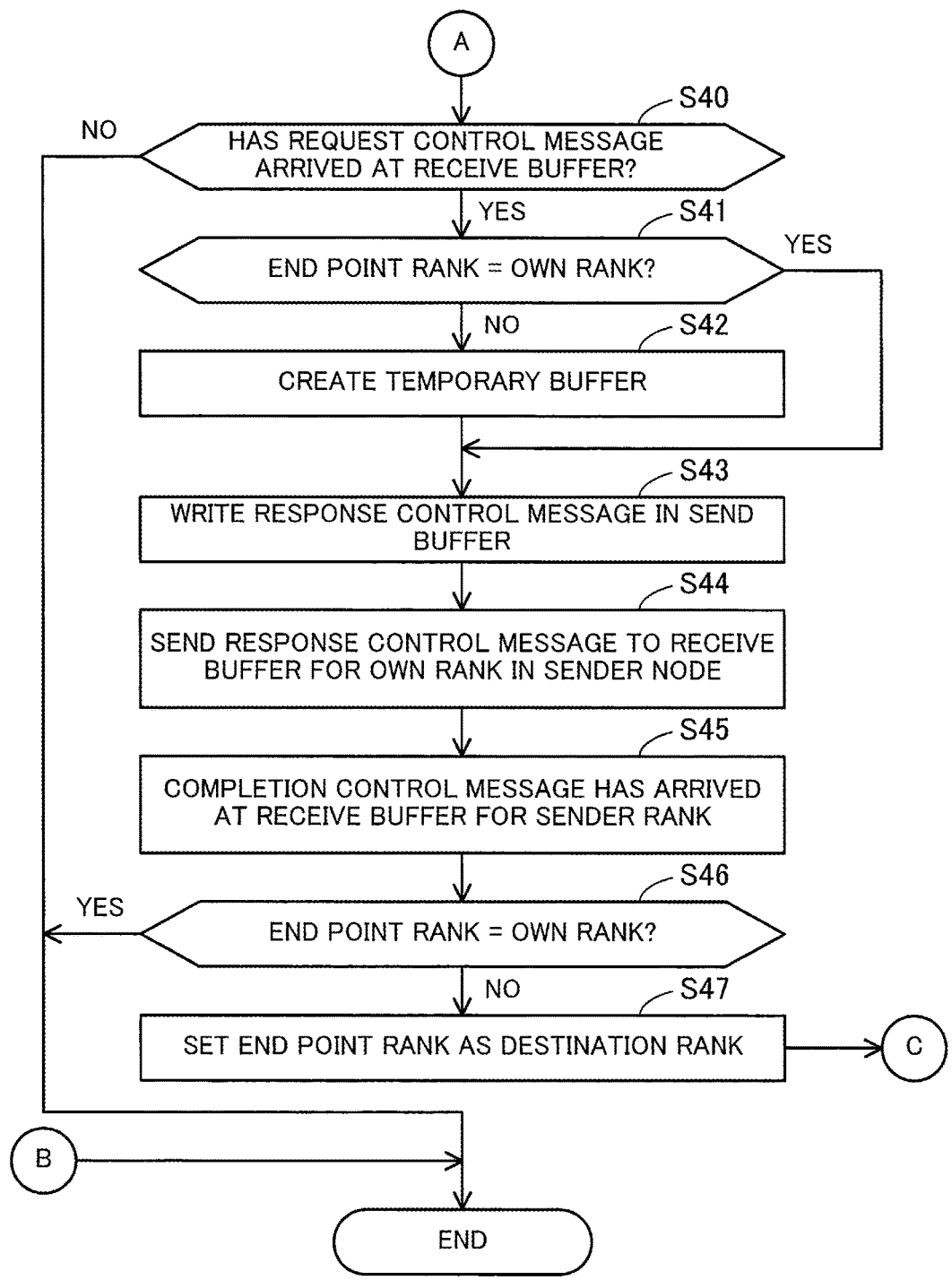
FIG. 21 is a second flowchart illustrating the procedure for the rendezvous communication.

FIG. 21 is a second flowchart illustrating the procedure for the rendezvous communication.

(S40) The receiving unit 135 determines whether a request control message has arrived at any receive buffer. If a request control message has arrived, the process proceeds to step S41. If no request control message has arrived, the process is completed.

(S41) The receiving unit 135 determines whether the end point rank included in the arriving request control message is the own rank. If the end point rank is the own rank, the process proceeds to step S43. If the end point rank is not the own rank, the process proceeds to step S42.

(S42) The receiving unit 135 creates a temporary buffer for a data payload.

(S43) The transmitting unit 134 generates a response control message and writes it in the send buffer 113d. In the response control message, the transmitting-side request identifier is the same as that included in the request control message of step S40, and the receiving-side request identifier is an identifier specified by the receiving unit 135. If the end point rank is the own rank, the user buffer address is the address of a user buffer specified by the process 111c. At this time, the receiving unit 135 has received a reception request for a data payload with rendezvous communication from the process 111c, and the user buffer is specified in the reception request. If the end point rank is not the own rank, the user buffer address is the address of the temporary buffer created at step S42.

(S44) The transmitting unit 134 sends the response control message stored in the send buffer 113d to the receive buffer for its own rank among the receive buffers provided in the node corresponding to the sender rank included in the request control message (i.e., sender node).

(S45) The receiving unit 135 detects that a completion control message has arrived at the receive buffer for the sender rank of step S44 (i.e., the same receive buffer as in step S40).

(S46) The receiving unit 135 determines whether the end point rank included in the request control message of step S40 is the own rank. If the end point rank is the own rank, the rendezvous communication is completed. If the end point rank is not the own rank, the process proceeds to step S47.

(S47) The relay control unit 136 sets the end point rank as a new destination rank, and instructs the transmitting unit 134 to transfer the data payload. Then, the process proceeds to step S34.

Figure 22:
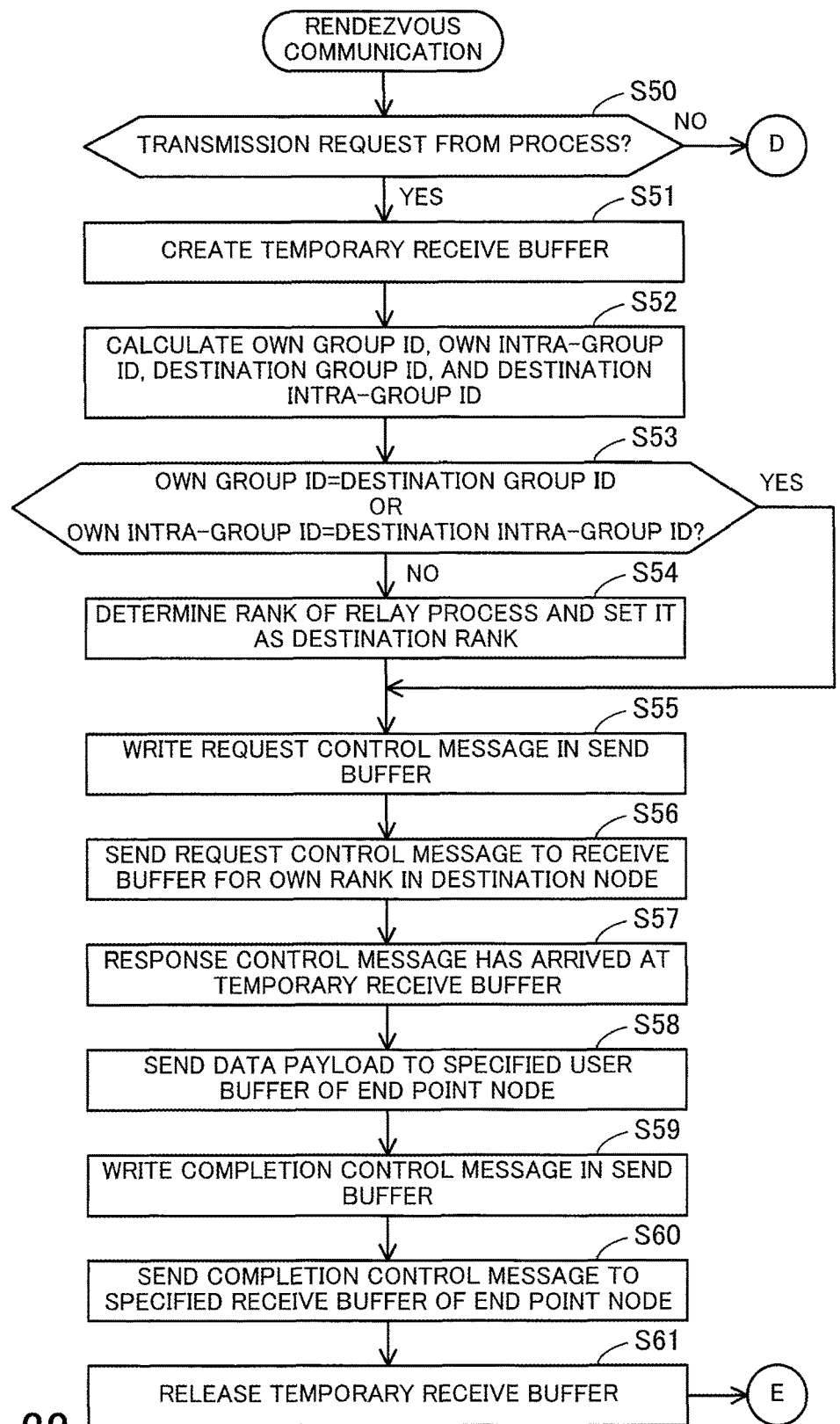
FIG. 22 is a third flowchart illustrating a procedure for rendezvous communication.

FIG. 22 is a third flowchart illustrating a procedure for rendezvous communication.

Here, a second rendezvous communication method will be described.

(S50) The transmitting unit 134 determines whether a transmission request for a data payload with rendezvous communication has arrived from the process 111c. If the transmission request has arrived, the process proceeds to step S51. Otherwise, the process proceeds to step S62.

(S51) The receiving unit 135 temporarily creates a receive buffer.

(S52) The transmitting unit 134 calculates an own group ID and an own intra-group ID from the own rank of the process 111c. In addition, the transmitting unit 134 calculates a destination group ID and a destination intra-group ID from the destination rank specified by the process 111c.

(S53) The transmitting unit 134 determines whether the own group ID of step S52 is the same as the destination group ID or the own intra-group ID of step S52 is the same as the destination intra-group ID. If this condition is satisfied, the process proceeds to step S55. If the condition is not satisfied, that is, if the own group ID is different from the destination group ID and the own intra-group ID is different from the destination intra-group ID, the process proceeds to step S54.

(S54) The transmitting unit 134 determines the rank of a relay process on the basis of the destination group ID and the own intra-group ID. The rank of the relay process is calculated as follows: "Rank of relay process"="Destination group ID"×"$N_{ppg}$"+"Own intra-group ID." However, if there is no relay process that satisfies the above condition, the transmitting unit 134 selects a process with the same intra-group ID as the destination process, as a relay process, from the group to which the process 111c belongs. The transmitting unit 134 sets the rank of the determined relay process as a destination rank. In addition, the transmitting unit 134 sets the destination rank specified by the process 111c as an end point rank.

(S55) The transmitting unit 134 generates a request control message and writes it in the send buffer 113d. In the request control message, the sender rank and start point rank are set to the own rank, and the transmitting-side request identifier is set to an identifier specified by the transmitting unit 134, and the end point rank is set to the destination rank specified by the process 111c. The transmitting-side temporary buffer address is set to the address of the receive buffer created at step S51.

(S56) The transmitting unit 134 sends the request control message stored in the send buffer 113d to the receive buffer for its own rank among the receive buffers provided in the destination node corresponding to the destination rank. If there is no relay process, the destination rank is the end point rank. If there is a relay process, the destination rank is the rank of the relay process.

(S57) The receiving unit 135 detects that a response control message has arrived at the receive buffer created at step S51.

(S58) The transmitting unit 134 reads a data payload from a user buffer specified by the process 111c, and sends the data payload to the user buffer specified in the response control message of step S57.

(S59) The transmitting unit 134 generates a completion control message and writes it in the send buffer 113d. The receiving-side request identifier in the completion control message is the same as that included in the response control message of step S57.

(S60) The transmitting unit 134 sends the completion control message stored in the send buffer 113d to the receive buffer specified in the response control message.

(S61) The receiving unit 135 releases the receive buffer of step S51. Then, the process is completed.

Figure 23:
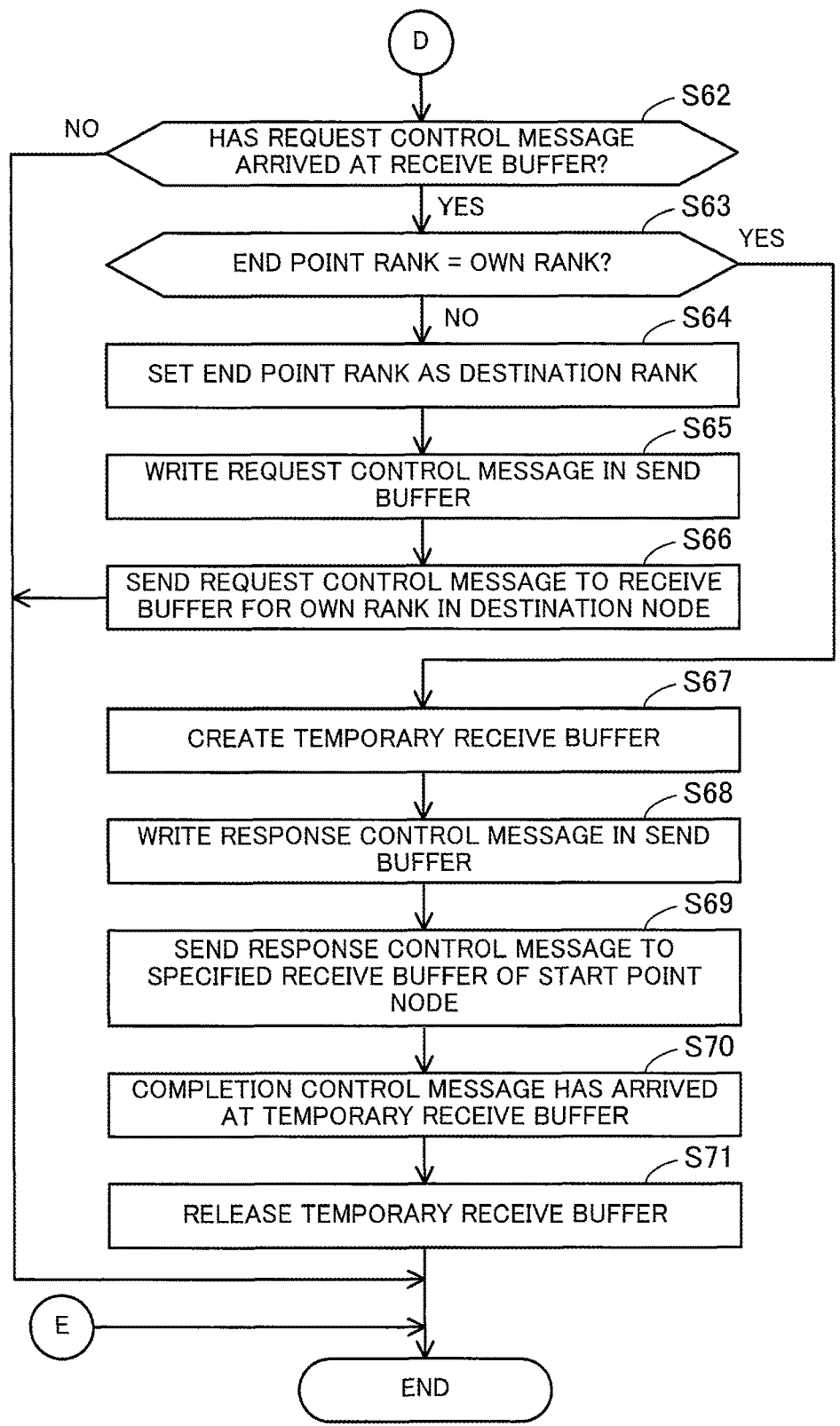
FIG. 23 is a fourth flowchart illustrating a procedure for the rendezvous communication.

FIG. 23 is a fourth flowchart illustrating an example of the procedure for the rendezvous communication.

(S62) The receiving unit 135 determines whether a request control message has arrived at any receive buffer. If a request control message has arrived, the process proceeds to step S63. If no request control message has arrived, the process is completed.

(S63) The receiving unit 135 determines whether the end point rank included in the arriving request control message is the own rank. If the end point rank is the own rank, the process proceeds to step S67. If the end point rank is not the own rank, the process proceeds to step S64.

(S64) The relay control unit 136 sets the end point rank as a new destination rank, and instructs the transmitting unit 134 to transfer the data payload.

(S65) The transmitting unit 134 writes a request control message in the send buffer 113d. In the request control message, the sender rank is set to the own rank. The transmitting-side request identifier, start point rank, end point rank, and transmitting-side temporary buffer address are the same as those included in the original request control message. That is, the request control message having substantially the same content as the original request control message is transferred.

(S66) The transmitting unit 134 sends the request control message stored in the send buffer 113d to the receive buffer for its own rank among the receive buffers provided in the destination node corresponding to the destination rank. Then, the process is completed.

(S67) The receiving unit 135 temporarily creates a receive buffer.

(S68) The transmitting unit 134 generates a response control message and writes it in the send buffer 113d. In the response control message, the transmitting-side request identifier is the same as that included in the request control message of step S62. The receiving-side request identifier is set to an identifier specified by the receiving unit 135. The user buffer address is set to the address of a user buffer specified by the process 111c. The receiving-side temporary buffer address is set to the address of the receive buffer created at step S67.

(S69) The transmitting unit 134 sends the response control message stored in the send buffer 113d to the receive buffer identified by the transmitting-side temporary buffer address included in the request control message. This receive buffer is a receive buffer provided in the node corresponding to the start point rank included in the request control message (i.e., start point node).

(S70) The receiving unit 135 detects that a completion control message has arrived at the receive buffer created at step S67.

(S71) The receiving unit 135 releases the receive buffer of step S67.

With the parallel processing apparatus of the second embodiment, each node creates, in its RAM, only receive buffers for processes belonging to the same group and receive buffers for partner processes belonging to the other groups. Receive buffers that constantly exist for the other processes do not need to be created. This makes it possible to reduce the number of receive buffers, and to reduce the RAM usage accordingly. In addition, a group identifier and an intra-group identifier of each process are calculated from the rank of the process, and then it is determined which processes receive buffers need to be created for, on the basis of the group identifiers and intra-group identifiers. Therefore, each node is able to independently determine receive buffers to be created.

In addition, in principle, a partner process with the same intra-group identifier as a sender process is selected as a relay process. Therefore, it is possible that different nodes are used to transfer messages. This prevents concentration of messages on a specific node. This makes it possible to reduce the risk of degrading the performance of the parallel processing apparatus due to the specific node being a bottleneck. In addition, with the second rendezvous communication method, a node having a relay process transfers only a request control message, and the other control messages and data payload are sent from a start point node directly to an end point node. This reduces the number of transmissions of messages.

According to one aspect, it is possible to reduce the number of receive buffers used in inter-node communication.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable recording medium storing a computer program that causes a computer used as a first node among a plurality of nodes to perform a procedure comprising:
   determining one or more second nodes belonging to a same first group as the first node among the plurality of nodes, and creating first receive buffers corresponding one-to-one to the one or more second nodes in a memory provided in the first node;
   determining a third node belonging to a second group and one or more fourth nodes belonging to the second group among the plurality of nodes, and creating a second receive buffer corresponding to the third node in the memory, without creating receive buffers corresponding to the one or more fourth nodes in the memory; and
   using one of the first receive buffers corresponding to one of the one or more second nodes to receive a message when communicating with the one of the one or more second nodes, using the second receive buffer to receive a message when communicating with the third node, and using one of the first receive buffers and the second receive buffer to receive a message when communicating with one of the one or more fourth nodes.

2. The non-transitory computer-readable recording medium according to claim 1, wherein:
   each of the plurality of nodes is given an identifier; and
   the third node is selected from the second group, based on an identifier of the first node and identifiers of nodes belonging to the second group.

3. The non-transitory computer-readable recording medium according to claim 1, wherein:
   the procedure further includes causing each of the plurality of nodes to calculate a group identifier and an intra-group identifier;
   the one or more second nodes have a same group identifier as the first node;
   the third node has a different group identifier from the first node and has a same intra-group identifier as the first node; and
   the one or more fourth nodes have a different group identifier from the first node and have different intra-group identifiers from the first node.

4. The non-transitory computer-readable recording medium according to claim 1, wherein the procedure further includes exercising control so as to communicate directly with the one of the one or more second nodes, to communicate directly with the third node, and to communicate with the one of the one or more fourth nodes via one of the one of the one or more second nodes and the third node.

5. The non-transitory computer-readable recording medium according to claim 1, wherein the procedure further includes:
  temporarily creating a third receive buffer in the memory for the one of the one or more fourth nodes upon arrival of a first message at one of the first receive buffers via one of the one or more second nodes or upon arrival of the first message at the second receive buffer via the third node, the first message being generated by the one of the one or more fourth nodes; and
  allowing the first node to use the third receive buffer to receive a second message related to the first message directly from the one of the one or more fourth nodes.

6. A parallel processing apparatus comprising:
  a first node including a memory and a processor; and
  a plurality of other nodes connected to the first node over a network, wherein
  the processor performs a procedure including
    determining one or more second nodes belonging to a same first group as the first node among the plurality of other nodes, and creating first receive buffers corresponding one-to-one to the one or more second nodes in the memory,
    determining a third node belonging to a second group and one or more fourth nodes belonging to the second group among the plurality of other nodes, and creating a second receive buffer corresponding to the third node in the memory, without creating receive buffers corresponding to the one or more fourth nodes in the memory, and
    using one of the first receive buffers corresponding to one of the one or more second nodes to receive a message when communicating with the one of the one or more second nodes, using the second receive buffer to receive a message when communicating with the third node, and using one of the first receive buffers and the second receive buffer to receive a message when communicating with one of the one or more fourth nodes.

7. An inter-node communication method comprising:
  determining, by a parallel processing apparatus including a plurality of nodes, a first node belonging to a first group and one or more second nodes belonging to the first group among the plurality of nodes, and creating first receive buffers corresponding one-to-one to the one or more second nodes in a memory provided in the first node;
  determining, by the parallel processing apparatus, a third node belonging to a second group and one or more fourth nodes belonging to the second group among the plurality of nodes, and creating a second receive buffer corresponding to the third node in the memory, without creating receive buffers corresponding to the one or more fourth nodes in the memory; and
  using, by the parallel processing apparatus, one of the first receive buffers corresponding to one of the one or more second nodes to receive a message when the first node and the one of the one or more second nodes communicate with each other, using the second receive buffer to receive a message when the first node and the third node communicate with each other, and using one of the first receive buffers and the second receive buffer to receive a message when the first node and one of the one or more fourth nodes communicate with each other.

* * * * *